(12) United States Patent
Jackson et al.

(10) Patent No.: US 12,115,931 B2
(45) Date of Patent: Oct. 15, 2024

(54) SYSTEM AND METHOD FOR REMOTE INTERFACE WITH VEHICLE

(71) Applicant: Rivian IP Holdings, LLC, Plymouth, MI (US)

(72) Inventors: Abegael Annie Jackson, Richmond (CA); Leonid Kokhnovych, Burnaby (CA); Wei Kuai, Surrey (CA)

(73) Assignee: Rivian IP Holdings, LLC, Plymouth, MI (US)

( * ) Notice: Subject to any disclaimer, the term of this patent is extended or adjusted under 35 U.S.C. 154(b) by 185 days.

(21) Appl. No.: 17/880,308

(22) Filed: Aug. 3, 2022

(65) Prior Publication Data
US 2023/0077561 A1 Mar. 16, 2023

Related U.S. Application Data

(60) Provisional application No. 63/243,608, filed on Sep. 13, 2021.

(51) Int. Cl.
| | |
|---|---|
| *B60R 25/01* | (2013.01) |
| *G05D 1/00* | (2024.01) |
| *H04L 5/00* | (2006.01) |
| *H04W 4/40* | (2018.01) |
| *H04W 4/80* | (2018.01) |

(52) U.S. Cl.
CPC .......... *B60R 25/01* (2013.01); *G05D 1/0016* (2013.01); *G05D 1/0022* (2013.01); *H04L 5/0055* (2013.01); *H04W 4/40* (2018.02); *H04W 4/80* (2018.02); *B60R 2325/101* (2013.01); *B60R 2325/205* (2013.01)

(58) Field of Classification Search
None
See application file for complete search history.

(56) References Cited

U.S. PATENT DOCUMENTS

| | | | |
|---|---|---|---|
| 2019/0143996 A1* | 5/2019 | Fawaz | B60W 50/00 701/36 |
| 2020/0358308 A1* | 11/2020 | O'Toole | H04L 12/66 |

* cited by examiner

*Primary Examiner* — Thomas S McCormack
(74) *Attorney, Agent, or Firm* — Haley Guiliano LLP

(57) ABSTRACT

Systems and methods are provided for remotely controlling a vehicle. A command for controlling the vehicle may be received via a user interface of the device, a command for controlling the vehicle and a determination of whether a first two-way wireless connection is available between the device and the vehicle is made. In response to determining that the two-way wireless connection is available, the command is transmitted to the vehicle via the first two-way wireless connection. In response to determining that the first two-way wireless connection is not available, the command is transmitted to a remote server associated with the vehicle via a second two-way connection. In response to receiving a request to display the status information of the vehicle, the most recent status information received via the first two-way wireless connection or retrieved from a memory is displayed.

19 Claims, 11 Drawing Sheets

SYSTEM AND METHOD FOR REMOTE INTERFACE WITH VEHICLE

CROSS-REFERENCE TO RELATED APPLICATION

This application claims priority to U.S. Provisional Patent Application No. 63/243,608, filed on Sep. 13, 2021, the entire contents of which are hereby expressly incorporated by reference in their entirety.

INTRODUCTION

As users increasingly rely on personal devices (e.g., smartphones) to perform a variety of tasks, it may be advantageous to provide an application on a personal device of a user to allow the user to remotely interact with a vehicle.

SUMMARY

In some approaches, a device may communicate with a vehicle using a Bluetooth connection. However, if the Bluetooth connection fails or if the device not within the range required to maintain the Bluetooth connection, a user may not be able to control the vehicle or obtain status information of the vehicle. Consequently, what is needed are techniques for enabling reliable real-time communication between a device and a vehicle using a plurality of different communication paths (e.g., a Bluetooth connection and a connection via a remote server), so that a user is able to control functions of the vehicle and view status information of the vehicle via an interface of the device, when only one of the plurality of different communication paths is available.

In some approaches, in order to reduce latency and network resources when executing a vehicle command or viewing status information on a remote device (e.g., a smartphone), it may be advantageous to communicate with the vehicle over a direct connection (e.g., a connection according to the Bluetooth Low Energy (BLE) standard), when the direct connection is available. However, if the direct connection is not available (e.g., the direct connection fails or the device is outside of the range of the direct connection), it may be advantageous to instead communicate with the vehicle through a remote server (e.g., via a mobile connection such as LTE or a Wi-Fi connection), without requiring any additional input from a user. Additionally, because status information of the vehicle (e.g., door lock status, battery charge level, etc.) may be separately provided over each of the communication paths, it may be advantageous to determine which status information likely corresponds to the current status of the vehicle (i.e., the most recent status information).

In accordance with the present disclosure, systems and methods are provided for remotely controlling a vehicle and for providing accurate vehicle status information, regardless of the status of communication paths of the vehicle or the device for remotely controlling the vehicle. In some embodiments, a control method of a device for remotely controlling a vehicle is provided. The method includes receiving, via a user interface of the device, a command for controlling the vehicle, and determining whether a first two-way wireless connection is available between the device and the vehicle. In response to determining that the first two-way wireless connection is available, the command is transmitted to the vehicle via the first two-way wireless connection. In response to determining that the first two-way wireless connection is not available, the command is transmitted to a remote server associated with the vehicle via a second two-way connection (e.g., a cellular connection).

In some embodiments, the first two-way wireless connection may be a BLE connection.

In some embodiments, the determination that the first two-way wireless connection is not active may include determining that the first two-way wireless connection is not active or determining that transmitting the command to the vehicle via the first two-way wireless connection was not successful.

In some embodiments, the determination that transmitting the command to the vehicle via the first two-way wireless connection was not successful comprises determining that an acknowledgment is not received within a first predetermined time of transmitting the command to the vehicle via the first two-way wireless connection.

In some embodiments, the method may further include, in response to transmitting the command to the remote server via the cellular connection, determining whether the command was received by the vehicle by determining whether an acknowledgement is received within a second predetermined time of transmitting the command via the cellular connection, and in response to determining that the command was not received by the vehicle, displaying, via an interface of the device, an indication that the command failed.

In some embodiments, the device may be a mobile device.

In some embodiments, the command may be a lock command for locking the vehicle or an unlock command for unlocking the vehicle.

In some embodiments, a device for remotely controlling a vehicle is provided. The device includes a user interface; a memory storing instructions; and control circuitry configured to execute the instructions stored in the memory to receive, via the user interface, a command for controlling the vehicle, and determine whether a first two-way wireless connection is available between the device and the vehicle. In response to determining that the first two-way wireless connection is available, the control circuitry is configured to transmit the command to the vehicle via the first two-way wireless connection. In response to determining that the first two-way wireless connection is not available, the control circuitry is further configured to transmit the command to a remote server associated with the vehicle via second two-way wireless connection (e.g., a cellular connection).

In some embodiments, the device may be a mobile device and the first two-way wireless connection may be a BLE connection.

In some embodiments, a control method of a device for remotely controlling a vehicle is provided. The method includes receiving, from the vehicle, first status information of the vehicle via a first two-way wireless connection between the device and the vehicle, and receiving, from a remote server, second status information of the vehicle via a second two-way wireless connection (e.g., a cellular connection) with a remote server. In response to receiving, via a user interface of the device, a request to display status information of the vehicle, the method includes determining the most recent one of the first and second status information by comparing a first timestamp associated with the first status information with a second timestamp associated with the second status information, and displaying, on the user interface of the device, the most recent status information.

In some embodiments, receiving the first status information may include, in response to receiving the request to display the status information of the vehicle, determining whether the first two-way wireless connection is available between the device and the vehicle. In response to determining that the first two-way wireless connection is available, the method may include transmitting a first request for the first status information to the vehicle via the first two-way wireless connection, wherein the first status information may be received in response to transmitting the first request. In response to determining that the first two-way wireless connection is not available, the method may further include retrieving, from a memory of the device, the most recent status information received from the vehicle via the first two-way wireless connection as the first status information.

In some embodiments, receiving the second status information may include, in response to receiving the request to display the status information of the vehicle, determining whether the cellular connection is available. In response to determining that the cellular connection is available, the method may further include transmitting a second request for the second status information to the remote server via the cellular connection, wherein the second status information may be received in response to transmitting the second request. In response to determining that the cellular connection is not available, the method may further include retrieving, from the memory of the device, the most recent status information received from the remote server as the second status information.

In some embodiments, displaying the most recent status information may include displaying the most recent status information in association with the corresponding one of the first and second timestamps.

In some embodiments, the first timestamp may indicate when the vehicle generated the first status information and the second timestamp may indicate when the vehicle generated the second status information.

In some embodiments, the first two-way wireless connection may be a BLE connection.

In some embodiments, a device for remotely controlling a vehicle is provided. The device includes a user interface, a memory storing instructions, and control circuitry configured to execute the instructions stored in the memory to receive, from the vehicle, first status information of the vehicle via a first two-way wireless connection between the device and the vehicle, and receive, from a remote server, second status information of the vehicle via a second two-way wireless connection (e.g., a cellular connection) with a remote server. In response to receiving, via the user interface, a request to display status information of the vehicle, the control circuitry is further configured to determine the most recent one of the first and second status information by comparing a first timestamp associated with the first status information with a second timestamp associated with the second status information, and display, on the user interface, the most recent status information.

In some embodiments, the control circuitry may be further configured, when receiving the first status information, to, in response to receiving the request to display the status information of the vehicle, determine whether the first two-way wireless connection is available between the device and the vehicle. In response to determining that the first two-way wireless connection is available, the control circuitry may be further configured to transmit a first request for the first status information to the vehicle via the first two-way wireless connection, wherein the first status information may be received in response to transmitting the first request. In response to determining that the first two-way wireless connection is not available, the control circuitry may be further configured to retrieve, from the memory, the most recent status information received from the vehicle via the first two-way wireless connection as the first status information.

In some embodiments, the control circuitry may be further configured, when receiving the second status information, to, in response to receiving the request to display the status information of the vehicle, determine whether the cellular connection is available. In response to determining that the cellular connection is available, the control circuitry may be further configured to transmit a second request for the second status information to the remote server via the cellular connection, wherein the second status information may be received in response to transmitting the second request. In response to determining that the cellular connection is not available, the control circuitry may be further configured to retrieve, from the memory, the most recent status information received from the remote server as the second status information.

In some embodiments, the control circuitry may be further configured, when displaying the most recent status information, to display the most recent status information in association with the corresponding one of the first and second timestamp. In some embodiments, the first timestamp may indicate when the vehicle generated the first status information and the second timestamp may indicate when the vehicle generated the second status information.

In some embodiments, the device may be a smartphone and the first two-way wireless connection may be a BLE connection.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
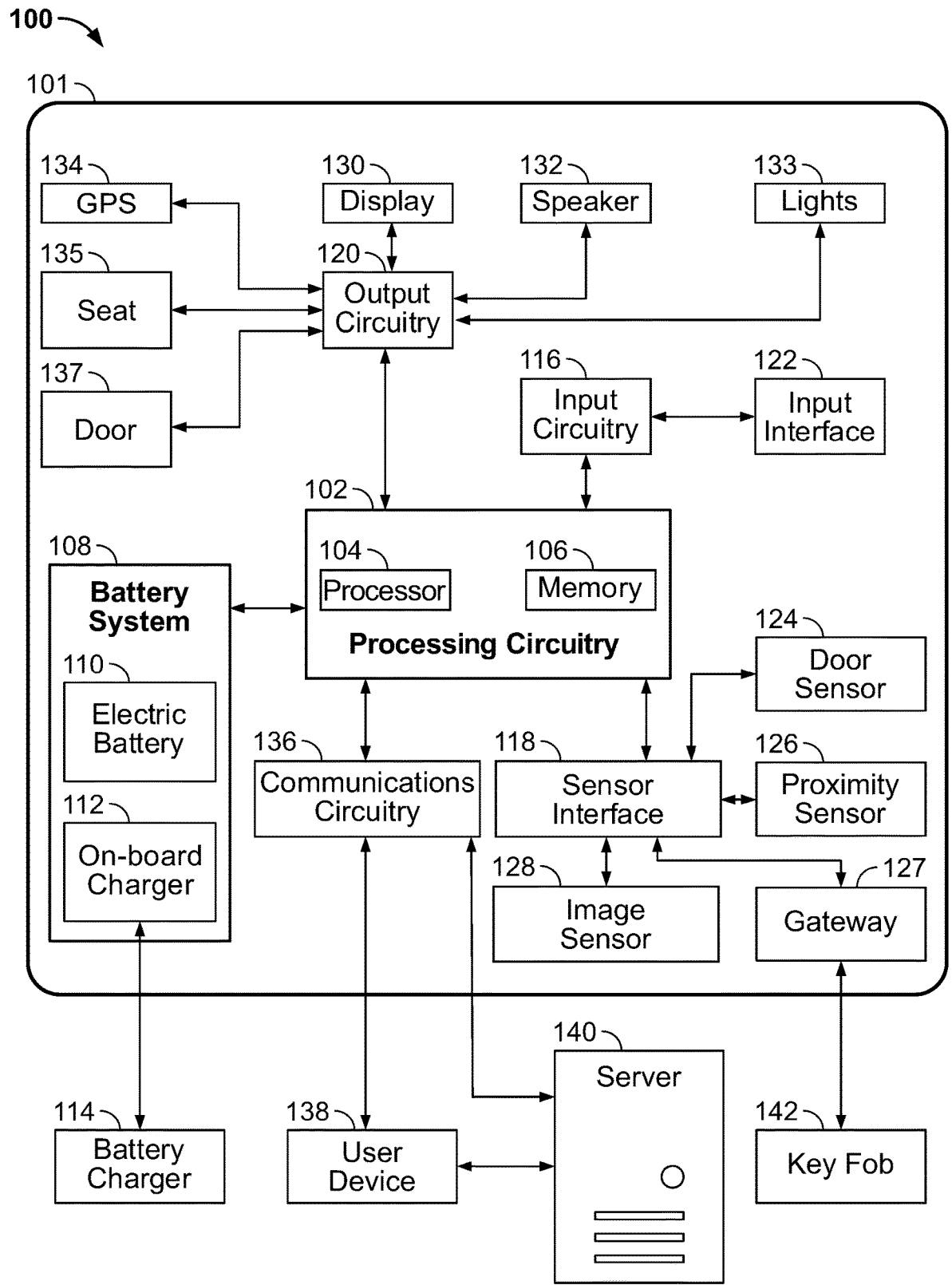
FIG. 1 shows a block diagram of components of a system including vehicle 101, in accordance with some embodiments of the present disclosure.

FIG. 1 shows a block diagram of components of a system 100 including vehicle 101, in accordance with some embodiments of the present disclosure. Vehicle 101 may be a car (e.g., a coupe, a sedan, a truck, an SUV, a bus), a motorcycle, an aircraft (e.g., a drone), a watercraft (e.g., a boat), or any other type of vehicle.

Vehicle 101 may comprise processing circuitry 102, which may comprise processor 104 and memory 106. Processor 104 may comprise a hardware processor, a software processor (e.g., a processor emulated using a virtual machine), or any combination thereof. In some embodiments, processor 104 and memory 106 in combination may be referred to as processing circuitry 102 of vehicle 101. In some embodiments, processor 104 alone may be referred to as processing circuitry 102 of vehicle 101. Memory 106 may comprise hardware elements for non-transitory storage of commands or instructions, that, when executed by processor 104, cause processor 104 to operate vehicle 101 in accordance with embodiments described above and below. Processing circuitry 102 may be communicatively connected to components of vehicle 101 via one or more wires, or via wireless connection. As discussed in further detail with reference to FIG. 2, processing circuitry may comprise a central controller and a plurality of domain controllers.

Processing circuitry 102 may be communicatively connected to battery system 108, which may be configured to provide power to one or more of the components of vehicle 101 during operation. Although vehicle 101 is described as being an electric vehicle, it should be understood that vehicle 101 may be any suitable type of vehicle (e.g., internal combustion engine vehicle, hybrid vehicle, etc.). Battery system 108 may comprise electric battery 110, which may include one or more battery modules. Battery system 108 may further comprise on-board charger 112 to manage the flow of electricity to electric battery 110 (e.g., to perform AC-DC conversion when battery charger 114 is an A.C. charger), and any other suitable components. In some embodiments, on-board charger 112 may include connectors for interfacing with battery charger 114. Battery system 108 may be configured to manage charging of battery 110, which may include measuring one or more characteristics of battery 110, identifying if a fault has occurred, providing power to components of vehicle 101, communicating with battery charger 114, any other suitable actions, or any combination thereof. In some embodiments, battery system 108 may include one or more domain controllers configured to perform battery monitoring, charge, and discharge functions, as described in greater detail with reference to FIG. 2. Battery system 108 may include, for example, electrical components (e.g., switches, bus bars, resistors, capacitors), control circuitry (e.g., for controlling suitable electrical components), and measurement equipment (e.g., to measure voltage, current, impedance, frequency, temperature, or another parameter). Battery system 108 may provide charge status information to processing circuitry 102. Charge status information includes, for example, charge level, whether the battery is being charged, charging current, charging voltage, charging mode, and whether a charging fault exists.

Battery charger 114 may be coupled to a power source, e.g., a power transmission grid, a solar panel, a generator, a wind turbine, or another vehicle, and may be configured to provide charging current at a suitable charging voltage to electric battery 110 of vehicle 101. In some embodiments, battery charger 114 may correspond to a charger at a D.C. station (e.g., D.C. fast electric charging station) or A.C. station. Battery charger 114 may be, for example, a fixed charging station (e.g., a charging station installed in a public location or in a user's home), or a portable charger (e.g., a charger connected to a portable generator, a portable solar panel, or another vehicle). In some embodiments, battery charger 114 may be capable of charging electric battery 110 at one or more voltages, with one or more current limitations. For example, battery charger 114 may receive information from battery system 108 indicating what voltage, current, or both, vehicle 101 may be charged with. Battery charger 114 may provide a charging current that is limited by one or more constraints. For example, vehicle 101 may communicate to battery charger 114 what charging current is desired for charging. In a further example, a cable type may have a maximum associated current capacity based on insulation and heat transfer considerations. In some embodiments, battery charger 114 and on-board charger 112, support both the inflow and outflow of current from electric battery 110 via a coupling. For example, during vehicle to vehicle charging or vehicle to grid power supply, battery charger 114 and/or on-board charger 112 may direct power from electric battery 110 to a power source coupled to battery charger 114, such as a battery of another vehicle or an electric power grid.

Image sensor 128 (e.g., a camera) may be communicatively coupled to processing circuitry 102 (e.g., by way of sensor interface 118) and positioned at any suitable position in an interior or exterior of vehicle 101. In some embodiments, image sensor 128 may capture images of destinations traveled to by vehicle 101 to identify driving habits of vehicle 101. Processing circuitry 102 may be communicatively connected to input interface 122 (e.g., a steering wheel, a touch screen display, buttons, knobs, a microphone or other audio capture device, etc.) via input circuitry 116. In some embodiments, a driver of vehicle 101 may be permitted to select certain settings in connection with the operation of vehicle 101 (e.g., input a range selection, etc.). In some embodiments, processing circuitry 102 may be communicatively connected to Global Positioning System (GPS) system 134 of vehicle 101, where the driver may interact with the GPS system via input interface 122. GPS system 134 may be in communication with multiple satellites to ascertain the vehicle's location and provide navigation directions to processing circuitry 102. As another example, the positioning device may operate on terrestrial signals, such as cell phone signals, Wi-Fi signals, or ultra-wideband signals to determine a location of vehicle 101. The determined location may be in any suitable form such as a geographic coordinate, a street address, a nearby landmark such as an identification of the nearest charging station or a tagged location associated with the vehicle (e.g., a location of a home of the user stored in memory 106).

Processing circuitry 102 may be communicatively connected to display 130, speaker 132, lights 133, seat 135, and door 137 by way of output circuitry 120. In some embodiments, output circuitry 120 may comprise one or more domain controllers, as described in greater detail with reference to FIG. 2. Display 130 may be located at a dashboard of vehicle 101 and/or a heads-up display at a windshield of vehicle 101. For example, an interface for GPS system 134 or an interface of an infotainment system may be generated for display, and display 130 may comprise an LCD display, an OLED display, an LED display, or any other type of display. In some embodiments, display 130 may provide a driver with a navigation interface, an entertainment interface, a backup camera interface, etc. Speaker 132 may be located at any location within the cabin of vehicle 101, e.g., at the dashboard of vehicle 101, on an interior portion of the vehicle door. In some embodiments, speaker 132 may be configured to provide audio alerts related to intermediate charging range information and estimated charge time information based on information output by battery system 108. In some embodiments, speaker 132 may provide audio that is audible outside of vehicle 101 (e.g., a personalized greeting during a welcome action of the vehicle). Lights 133 may be interior or exterior lights that provide light from inside or outside of vehicle 101 (e.g., during a welcome action of the vehicle).

Processing circuitry 102 may be communicatively connected (e.g., by way of sensor interface 118) to door sensor 124 (e.g., which may sense an open door of vehicle 101), proximity sensor 126 (e.g., which may determine the distance separating a device (e.g., key fob 142) and vehicle 101), and gateway 127 (e.g., which may be configured to receive signals from a key fob associated with vehicle 101 (e.g., key fob 142).

In some embodiments, processing circuitry 102 may be in communication (e.g., via communications circuitry 136) with user device 138 (e.g., a mobile device, a computer, key fob 142, etc.). Such connection may be wired or wireless. In one example, such a connection is a two-way connection via the Bluetooth Low Energy (BLE) standard. In some embodiments, user device 138 may execute instructions stored in memory to run a vehicle interface application, e.g., to provide information related to vehicle 101. In some embodiments, communications circuitry and/or user device 138 may be in communication with one or more servers 140 (e.g., over a communications network such as, for example, the Internet). In some embodiments, user device 138 may be the mobile device illustrated in FIG. 4 (e.g., mobile device 400).

It should be appreciated that FIG. 1 only shows some of the components of vehicle 101, and it will be understood that vehicle 101 also includes other elements commonly found in vehicles (e.g., vehicles), e.g., a motor, brakes, wheels, wheel controls, turn signals, windows, doors, etc. Vehicle 101 may also include a plurality of domain controllers and a central controller for managing power modes of components of vehicle 101, as shown in greater detail with reference to FIG. 2.

Figure 2:
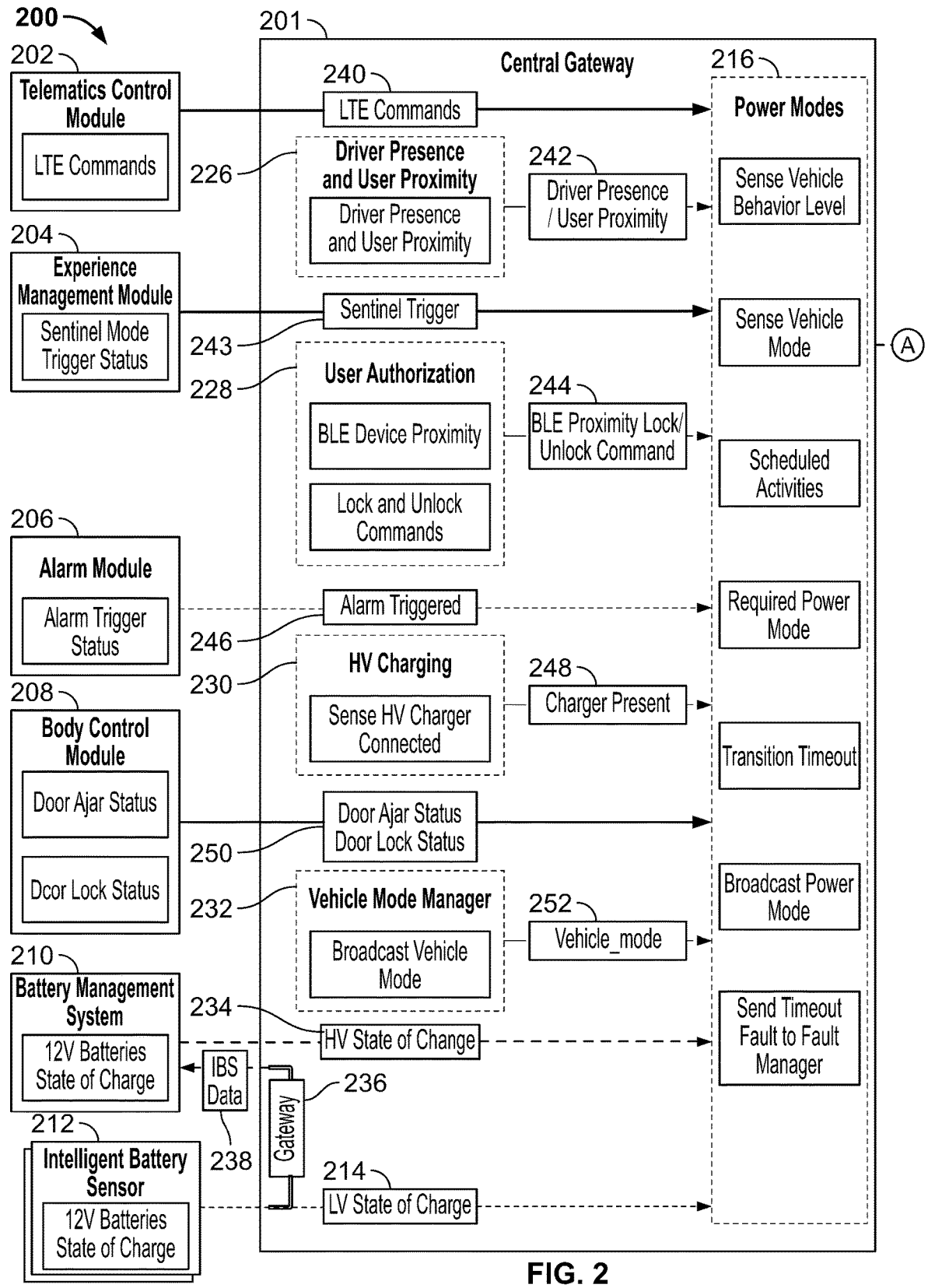
FIG. 2 shows a block diagram of illustrative control system comprising a central and a plurality of domain controllers, in accordance with some embodiments of the present disclosure.
Figure 2:
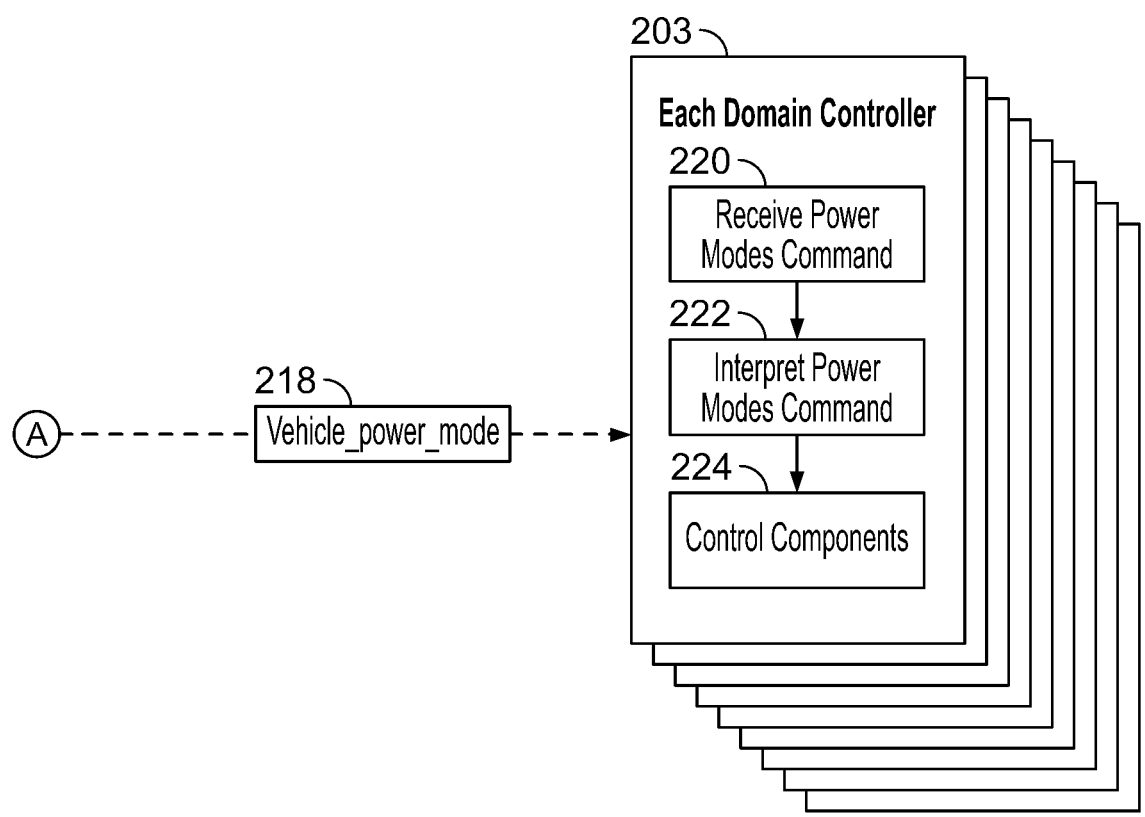

FIG. 2 shows a block diagram of illustrative control system 200 comprising a central gateway 201 (e.g., central controller) and a plurality of domain controllers 203 (e.g., modules), in accordance with some embodiments of the present disclosure. The illustrative control system may correspond to certain elements illustrated in FIG. 1 (e.g., processing circuitry 102, sensor interface 118, output circuitry 120, etc.). Control system 200 may implement a power modes application to coordinate vehicle-level management of wake and sleep behaviors of devices in vehicle 101. For example, the power modes application may coordinate vehicle-level management of wake and sleep behaviors of devices of vehicle 101 to reduce unnecessary power consumption by the controllers/devices of vehicle 101, while making vehicle 101 appear to a user as though it is always on. As shown, domain controllers 203 may include, e.g., telematics control module (TCM) 202, experience management module (XMM) 204, alarm module 206, body control module (BCM) 208, battery management system (BMS) 210, and intelligent battery sensor (IBS) 212. However, these are only some examples, and domain controllers 203 may include other suitable vehicle modules such as an autonomous control module (ACM), an autonomous safety module (ASM), a vehicle dynamics module (VDM), a thermal management module (TMM), etc. Domain controllers 203 may control certain functions of vehicle 101. Network management by the power modes application may allow for coordination between different power-saving states (e.g., a sleep state, a standby state, a ready state, and a stealth state) and an ON state (i.e., a wake (awake) state, or a go state) of the distributed domain controllers 203 within vehicle 101. The power-saving states may turn off certain hardware and/or software resources, as well as reduce the frequency of certain checks or control routines. In one embodiment, a domain controller in a stealth state may appear to be off to the other ones of domain controllers 203 and to central gateway 201, but itself is able to wake up (e.g., from a sleep state) and wake downstream components to perform any functionality that is not dependent on another subsystem. For example, IBS 212, while in a stealth state, may periodically wake itself up to monitor conditions of the electric battery 110 (e.g., battery state of charge, battery voltage, etc.) without waking up any other domain controllers 203 (ECUs). If IBS 212 detects a condition that needs to be reported to central gateway 201 (e.g., a low battery condition), IBS 212 sends a notification (e.g., low voltage (LV) state of charge notification 234) to central gateway 201 to inform central gateway 201 of the condition. Otherwise, IBS 212 returns to a sleep mode until the next scheduled wake-up time to monitor the specified conditions. In some embodiments, IBS 212 also communicates IBS data 238 to BMS 210 through gateway 236. In response to receiving a notification (e.g., notification 214), central gateway 201 may compute, e.g., by power modes module 216, the required power mode of control system 200 (e.g., a standby state) and broadcast the power mode (e.g., by vehicle power mode command 218) to each of the plurality of domain controllers 203 (e.g., using a C-Bus protocol). In response to receiving vehicle power mode command 218 at step 220, each of the plurality of domain controllers 203 may interpret vehicle power mode command 218 and make a determination of whether to update their current state (e.g., distributed responsibility) at step 222, and control respective components and optionally update their current state based on the result of the determination at step 224.

Central gateway 201 and the plurality of domain controllers 203 may be implemented using software running on one or more general purpose or specialized processors (e.g., electronic control units (ECUs) or electronic control modules (ECMs)). For example, in one embodiment, as shown, control system 200 may be implemented by a plurality of devices (modules) and a plurality of software components.

Control gateway 201 and one or more of the plurality of domain controllers 203 may implement different types of suitable functions for the operation of vehicle 101. For example, control gateway 201 and one or more of the plurality of domain controllers 203 implement sense functions (e.g., for monitoring or detecting a condition), compute functions (e.g., for computing a power mode or computing a value-based input from the sense functions), and act functions (e.g., to send a notification or command or broadcast a power mode, or to implement control).

In one example, the sense functions for vehicle 101 may include an authorized Bluetooth low energy (BLE) device proximity function for determining the location/proximity of authorized BLE devices, a driver presence function to determine if a driver is present, a lock and unlock commands function for receiving lock/unlock commands, a 12V battery state of charge (SOC) function for determining if the low voltage (LV) batteries need to be charged, an LTE commands function for receiving LTE commands vehicle functionality, a door ajar status function detecting when a door is ajar, a scheduled activity function for scheduling activities on an internal clock timer, an alarm trigger status function for waking the vehicle when an alarm is triggered, a sentinel mode trigger status function for waking the vehicle when a sentinel mode triggers an alert, a vehicle behavior level function for sensing the current vehicle behavior level, a vehicle mode function for sensing the current vehicle power mode, a high voltage (HV) charger connected function for sensing if an HV charger is connected, a receive vehicle power mode command function for receiving a vehicle power mode command (e.g., vehicle power mode command 218), etc.

In one example, the compute functions for vehicle 101 may include a required power mode function for computing the required power mode state, a transition time out function for imitating timeout for controller mode acknowledgments, an interpret vehicle power mode command function for determining which devices (e.g., domain controllers 203) need to be one or off based on a received vehicle power mode command, etc.

In one example, the act functions for vehicle 101 may include a broadcast power mode function for broadcasting the power mode to the vehicle, a send timeout fault function for sending a timeout fault to a fault manager, a control components function for turning domain devices (e.g., domain controllers 203) ON or OFF based on a power mode interpretation, etc.

It should be understood that the functions described above and illustrated in FIG. 2 are simply examples, and control system 200 may execute numerous other functions to maintain smooth operation and transitions between operating states, while reducing unnecessary power consumption when vehicle 101 or functions of vehicle 101 are not in use. Although some functions are illustrated or described as being performed by central gateway 201, this is only an example one or more of these functions may be performed by one of more of domain controllers 203. For example, in one embodiment, central gateway 201 may implement the BLE device proximity function to determine the location of authorized BLE devices (e.g., a mobile device of a user that is associated with vehicle 101). However, this is only an example, and it should be understood that a dedicated domain controller (e.g., a vehicle access system (VAS) module) may also perform this function.

As shown, certain components of control system 200 may communicate via a local interconnect network (LIN) protocol, a C-Bus protocol, Ethernet, by internet communication, etc. For example, as shown, BCM 208 may be implemented as a device (e.g., including an ECU) and may include a plurality of sense functions, including a door ajar status function and a door lock status function.

In one embodiment, as shown, central gateway 201 may be configured to implement driver presence module and user proximity module 226, user authorization module 228, HV charging module 230, and vehicle mode manager 232. However, this is only an example, and these modules may be implemented by individual domain controllers or by a combined domain controller (e.g., the VAS module). Driver presence module and user proximity module 226 may implement the driver presence and user proximity function, which may provide passive entry to vehicle 101, as described in further detail below. As shown, driver presence and user proximity module 226 may communicate driver presence/user proximity notification 242 to power modes module 216 (e.g., based on a determined driver presence or user proximity). User authorization module 228 may implement the BLE device proximity function and the lock and unlock commands function and may communicate BLE proximity lock/unlock command 244 to power modes module 216 (e.g., based on a determined BLE device proximity or received lock/unlock command). HV charging module 230 may implement the sense HV charger connected function and may communicate charger present notification 248 to power modes module 216 (e.g., based on a detected HV charger). HV charging module 230 may also control operation of the HV batteries of vehicle 101 (e.g., to power different vehicle components). Vehicle mode manager 232 may implement the broadcast vehicle module function and may communicate vehicle mode notification 252 to power modes module 216 (e.g., based on the current vehicle power mode). Additionally, as shown, power modes module 216 may implement a plurality of functions (e.g., the sense vehicle behavior level function, the sense vehicle mode function, the scheduled activities function, the required power mode function, the transition timeout function, the broadcast power mode function, and the send timeout fault to fault manager function) to generate and broadcast vehicle power mode command 218 to each of the plurality of domain controllers 203, as described above.

In one embodiment, as shown, TCM 202 may implement the LTE commands function and may communicate LTC commands 240 to central gateway 201. XMM 204 may implement the sentinel mode trigger status and may communicate sentential trigger 243 to central gateway 201 (e.g., when sentinel mode reaches an escalation level, which may be adjusted by a user or based on historical data). Alarm module 206 may implement the alarm trigger states and may communicate alarm triggered notification 246 to central gateway 201. BCM 208 may implement the door ajar function and the door lock status and may communicate the door ajar/door lock status 250 to central gateway 201. Although particular modules are described as implementing certain functions, it should be understood that this is only an example, and different modules may implement one or more functions described above or any other suitable vehicle functions.

Figure 3:
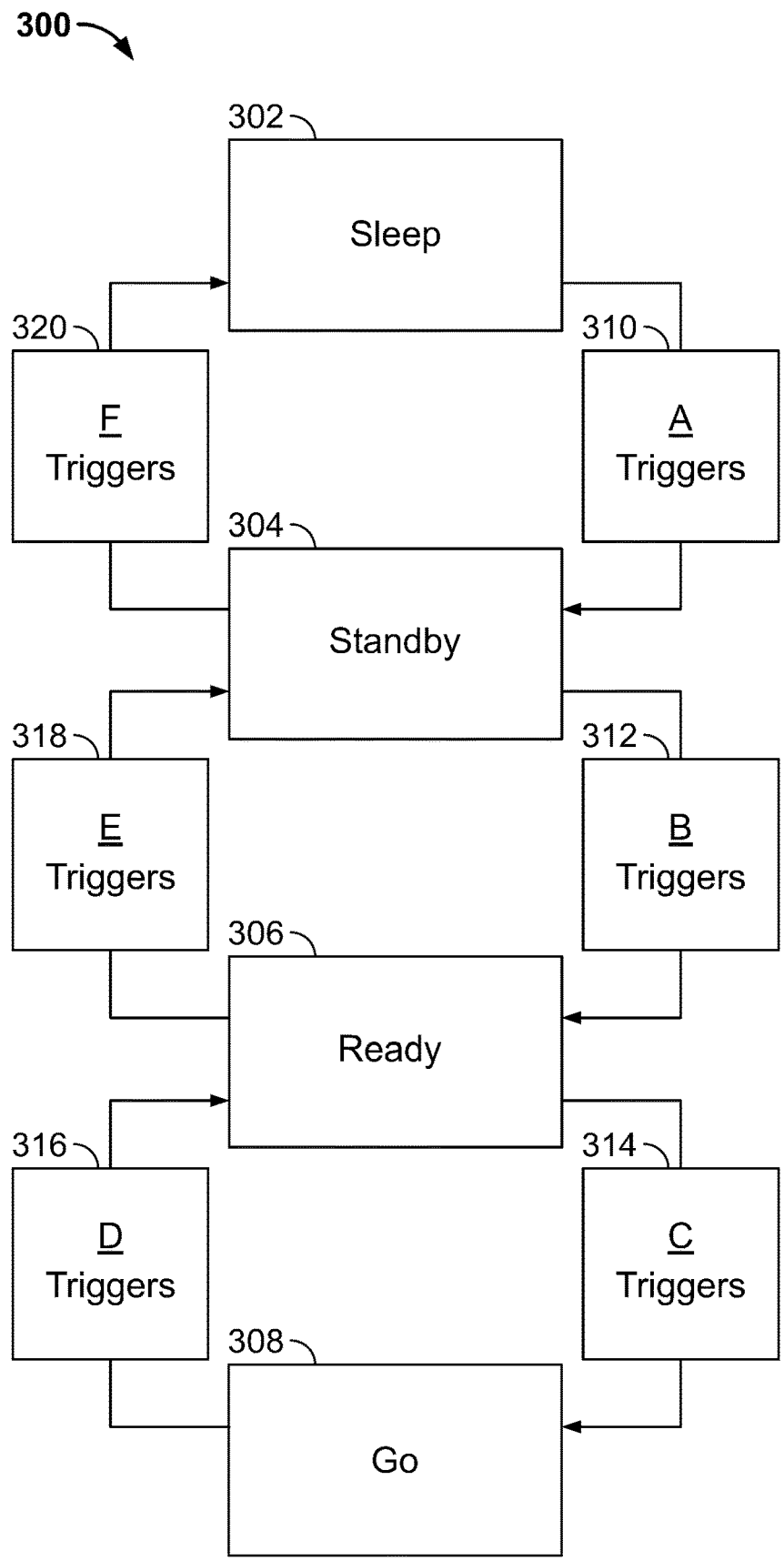
FIG. 3 illustrates a flow diagram of illustrative transitions between states of domain controllers of the control system of FIG. 2, in accordance with some embodiments of the present disclosure.

FIG. 3 illustrates a flow diagram 300 of illustrative transitions between states of domain controllers 203 of control system 200 of FIG. 2, in accordance with some embodiments of the present disclosure. Domain controllers 203 may operate in one of a plurality of states (e.g., sleep, standby, ready, and go) based on the current vehicle power mode state (e.g., sleep state 302, standby state 304, ready state 306, and go state 308). Additionally, other components of vehicle 101 may be activated or deactivated based on the current vehicle power mode. Central gateway 201 may transition between the vehicle power mode states based on triggers (e.g., A 310, B 312, C 314, D, 316, E 318, and F 320). In response to a determination to transition between vehicle power mode states, central gateway 201 broadcasts the updated vehicle power mode to each domain controller 203. For example, in response to determining that trigger A 310 is satisfied when the current vehicle power mode is sleep state 302, central gateway 201 broadcasts standby state 304 as the new vehicle power mode to domain controllers 203, which each interpret the broadcast power mode and make a determination of whether to update their current power state. For example, during a wake-up process (e.g., when a user is approaching vehicle 101), domain controllers 203 may interpret the broadcast vehicle power modes and make the determinations of whether to update their current state to a higher energy state (e.g., while transitioning from sleep state 302 to go state 308). Similarly, during a shut-down process (e.g., when a user leaves vehicle 101), domain controllers 203 may interpret the broadcast vehicle power modes and make the determinations of whether to update their current state to a lower energy state (e.g., while transitioning from go state 308 to sleep state 302). As described in further detail below, triggers (A 310— F 320) may include user and vehicle 101 actions or conditions that central gateway 201 to transition between vehicle power modes, as well as blockers and overrides that prevent transitions between vehicle power modes.

In sleep state 302, certain domain controllers may continue to operate periodically (e.g., a stealth state). For example, TCM 202 may continue to operate LTE/Wi-Fi modems but in a low-power state in which other components of TCM 202 are turned off (e.g., a suspend to RAM (STR) state). In an STR state, TCM 202 may be programmed to wake to perform other tasks at any given time. Other domain controllers may enter a sleep state in which they do not periodically wake to perform tasks unless, e.g., instructed by central gateway 201 to wake up (e.g., a true sleep state). For example, when a user has left vehicle 101 (e.g., triggering a lock command and timeout of a lock to sleep parameter) and central gateway 201 sends out a sleep command (e.g., vehicle power mode command 218) to each of the plurality of domain controllers 203. XMM 204, which operates the display and entertainment system, may enter a sleep state in response to receiving the sleep command from central gateway 201. XMM 204 may remain in the sleep state until receiving another command from central gateway 201 to change states (e.g., transition to a standby state when external BLE sensors of, e.g., the VAS, detects a user approaching vehicle 101). Thus, for example, if the user continues to vehicle 101 and opens the door, XMM 204 may quickly transition from the standby state to a ready state, and then to a go state (or full wake state) when the user is detected in vehicle 101. Thus, because, for example, the display and entertainment system are immediately ready to use when the user enters vehicle 101 (e.g., instead of having to wait for XMM 204 to boot up from a sleep state), unnecessary power consumption by XMM 204 is reduced (by transitioning to a sleep state when not in use), while not inconveniencing the user. Indeed, vehicle 101 will appear to a user to always be ready for use, as the user will not have to wait for booting of system components to finish.

Additionally, in some embodiments, in sleep state 302, the intrusion alarm and battery-based siren are active (e.g., through alarm module 206), as well as primary and secondary battery sensors (e.g., associated with IBS 212), central gateway 201 (or elements of central gateway 201), external BLE sensors, and NFC readers. However, this is only an example, and other suitable components or domain controllers may be active or partially active in sleep state 302.

While in sleep state 302, central gateway 201 may determine to transition to standby state 304, in response to trigger A 310 being satisfied. In some embodiments, trigger A 310 may be satisfied in response to either user actions or vehicle events occurring. In some embodiments, the user actions may include when: a VAS active entry is detected (e.g., from an associated FOB, mobile application (app), or NFC); a VAS passive entry is detected (e.g., user proximity within a predetermined range); a door ajar signal is received; certain LTE remote commands are received; a hazard switch is activated; a vehicle alarm alert is received, or eCall/SoS button is activated. In some embodiments, the vehicle event may include when: a CGM internal timer alarm is detected; a low battery alert is received; a scheduled HV charge is detected; a sentry mode alert is received; an HV charger pilot input is received; or cabin or battery thermal conditioning is required). In response to determining that trigger A 310 is satisfied, central gateway 201 transitions to standby state 304 and broadcasts the corresponding vehicle power mode to domain controllers 203.

In standby state 304, in addition to the active components of sleep state 302, the additional vehicle components and domain controllers may also be active: XMM 204 (e.g., so displays are ready to render and the audio amplifier and radio antennas are active), TCM 202, the interior BLE sensors, BCM 208, the VDM, dual-power inverter modules (DPIMs) (inverters), iBooster, ESP, RCM, and steering angle sensor, BMS 210, and the auxiliary air compressor. Activating BCM 208 may include activating door control modules, tailgate/liftgate control modules, all closure handles (e.g., doors, tailgate, trunk, frunk, gear tunnel), exterior lighting (e.g., functional and courtesy lighting), seat control modules, steering column adjust motors, etc.)

While in standby state 304, central gateway 201 may determine to transition to ready state 306, in response to trigger B 312 being satisfied (e.g., during a wake-up process) or to determine to transition to sleep state 302, in response to trigger F 320 being satisfied (e.g., during a shut-down process). In some embodiments, trigger B 312 may be satisfied when: a BLE device is determined to be within immediate range of vehicle 101 (e.g., within 2 meters); any vehicle door is opened; a vehicle seat is occupied; low voltage maintenance is required; a remote command requiring HV is received; or an HV charger is connected. In some embodiments, trigger B 312 may be blocked from being satisfied when an HV safety monitor fault is detected. In response to determining that trigger B 312 is satisfied (and not blocked), central gateway 201 transitions to ready state 306 and broadcasts the corresponding vehicle power mode to domain controller 203.

In ready state 306, in addition to the active components of standby state 304, the additional vehicle components and domain controllers may also be active: HV contactors may be closed, and HVAC/terminal components requiring HV.

While in ready state 306, central gateway 201 may determine to transition to go state 308, in response to trigger C 314 being satisfied (e.g., during a wake-up process) or to determine to transition to standby state 304, in response to trigger E 318 being satisfied (e.g., during a shut-down process). In some embodiments, trigger C 314 may be satisfied when the presence of the driver is detected or when a remote vehicle summon command is received.

In go state 308, all vehicle components and domain controllers are active. That is, any reminding vehicle components or domain controllers that were not active in ready state 306, are activated.

While in go state 308, central gateway 201 may determine to transition to ready state 306, in response to trigger D 316 being satisfied (e.g., during a shut-down process). In some embodiments, trigger D 316 may be satisfied when: no driver presence is detected (e.g., a driver exits vehicle 101); a pet mode is active; an auto-park operation is competed; or propulsion is disabled (e.g., by the VDM). In some embodiments, trigger D 316 may be blocked (or overridden) from being satisfied when: the vehicle drive selector is set to reverse, neutral or drive (e.g., not park); no HV is allowed at the end of a drive; or an HV plug is connected. In some embodiments, in response to detecting the driver exiting vehicle 101, a timeout timer may be started. In response to determining that trigger D 316 is satisfied (and not blocked or overridden), central gateway 201 transitions to ready state 306 and broadcasts the corresponding vehicle power mode to domain controller 203.

While in ready state 306, central gateway 201 may determine to transition to standby state 304, in response to trigger E 318 being satisfied (e.g., during a shut-down process). In some embodiments, trigger E 318 may be satisfied when a user is still near vehicle (e.g., within twenty-five meters) or a low-voltage mode (LVM) is completed (e.g., low voltage batteries have been charged). In some embodiments, trigger E 318 may be blocked (or overridden) from being satisfied when: pet mode is active; post-drive thermal conditioning is being performed (e.g., to prevent overheating); HV charge is active; HV power export is active; a battery is in a safe state; or no HV is allowed at the end of a drive. For example, if a user initiates "Pet Mode" (or a pet is detected), monitoring the temperature in the cabin of the vehicle and providing heating/cooling to maintain the temperature within a range to keep a pet safe (e.g., by a heating/cooling domain controller) is performed, and central gateway 201 may be blocked from transitioning to a lower energy state (e.g., standby state 304). In response to determining that trigger E 318 is satisfied (and not blocked or overridden), central gateway 201 transitions to standby state 304 and broadcasts the corresponding vehicle power mode to domain controllers 203.

While in standby state 304, central gateway 201 may determine to transition to sleep state 302, in response to trigger F 320 being satisfied (e.g., during a shut-down process). In some embodiments, trigger F 320 may be satisfied when: a predetermined time has passed since a lock command was received (e.g., thirty seconds); all vehicle closures have been closed and a predetermined time has passed (e.g., two minutes); all but one or fewer vehicle closures have been closed (e.g., only the vehicle tailgate remains open) and a predetermined time has passed (e.g., ten minutes); or a sleep mode is requested. In some embodiments, trigger F 320 may be blocked (or overridden) from being satisfied when: vehicle 101 is not in park, OTA is engaged; HV is enabled; or UDS programming or extended session. In response to determining that trigger F 320 is satisfied (and not blocked or overridden), central gateway 201 transitions to sleep state 302 and broadcasts the corresponding vehicle power mode to domain controllers 203.

Figure 4:
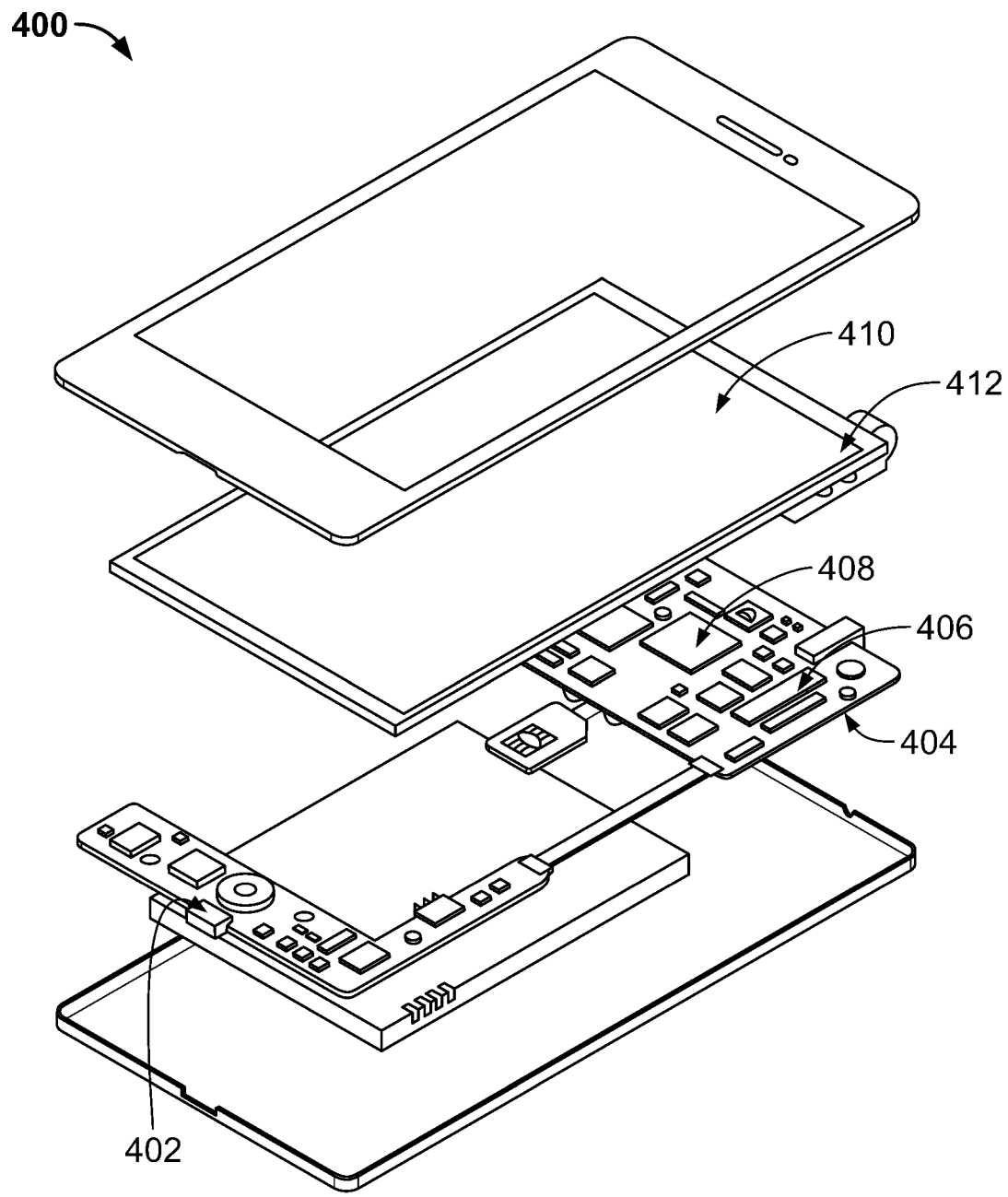
FIG. 4 shows an illustrative mobile device for controlling a vehicle using a vehicle interface application, in accordance with some embodiments of the present disclosure.

FIG. 4 shows an illustrative mobile device 400 for controlling vehicle 101 using a vehicle interface application, in accordance with some embodiments of the present disclosure. Each one of the user device 138 of FIG. 1 and the mobile device 601 of FIG. 6 may be implemented as the mobile device 400. As shown, the mobile device 400 may be a smartphone. As shown, the mobile device 400 includes and input/output (hereinafter "I/O") path 402, control circuitry 404, which includes processing circuitry 406 and storage 408, a user input interface 410, and a display 412. The mobile device 400 may receive and send data (e.g., vehicle commands, status information, etc.) using the I/O path 402, which may connect the control circuitry 404 (and specifically processing circuitry 406) to the communication paths described above (e.g., the BLE communication path and the mobile communication path). The control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, etc. The control circuitry 404 may execute instructions for a vehicle interface application stored in memory (i.e., the storage 408). Specifically, the control circuitry 404 may be instructed by the vehicle interface application to perform the functions discussed above. A user may send instructions to the control circuitry 404 using the user input interface 410. The user input interface 410 may be any suitable user interface, such as a touchscreen a voice recognition interface, etc. The display 412 may be provided as a stand-alone device or integrated with other elements of the mobile device 400. For example, the display 412 may be a touchscreen that is integrated or combined with the user input interface 410.

Figure 5:
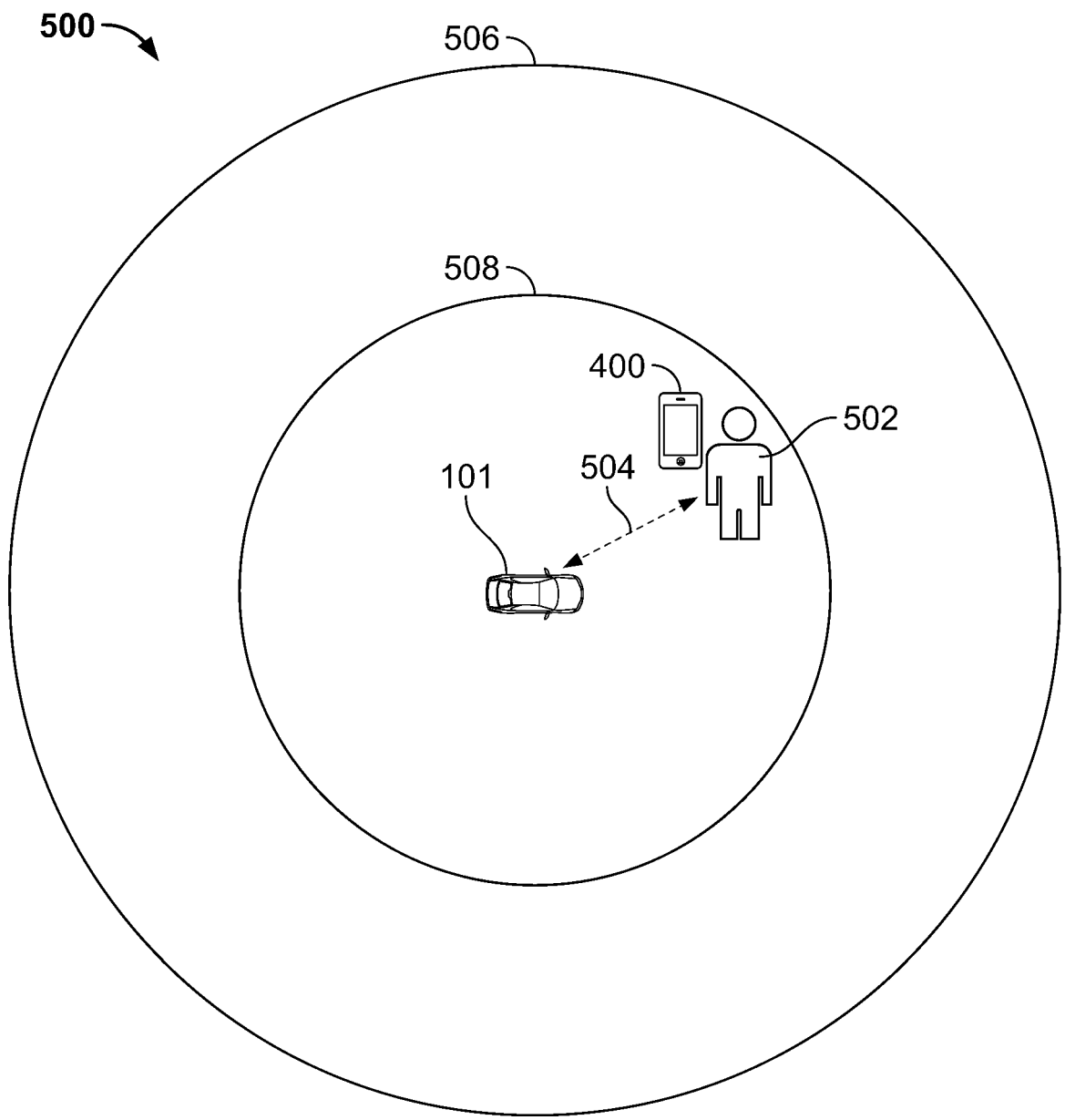
FIG. 5 shows an illustrative diagram for controlling power modes of a vehicle based on user proximity to the vehicle and for establishing a BLE between the vehicle and the mobile device, in accordance with some embodiments of the present disclosure.

FIG. 5 shows an illustrative diagram 500 for controlling power modes of vehicle 101 based on user proximity to vehicle and for establishing a BLE between vehicle 101 and mobile device 400, in accordance with some embodiments of the present disclosure. The process may be executed by processing circuitry 102 of FIG. 1, or, more specifically, control system 200 of FIG. 2. As shown, user 502 may be located outside of vehicle 101. As described above, control system 200 of vehicle 101 may have transitioned to a sleep state in order to conserve battery. While in the sleep state, control system 200 may monitor the area around vehicle 101 to detect the presence of user 502. For example, in one embodiment, the VAS (e.g., a domain controller/module implemented by communications circuitry 136 of FIG. 1) may listen, using a plurality of BLE sensors, for an advertisement from mobile device 400 (e.g., corresponding to user device 138 of FIG. 1) of user 502, transmitted according to the BLE standard. Based on the range of BLE, the VAS may detect an advertisement from mobile device 400 when the device is within a far zone from the vehicle, defined by boundary line 506 (which may be approximately 90 meters from vehicle 101, plus or minus 10 meters) and boundary line 508 (which may be approximately 25 meters from vehicle 101, plus or minus 5 meters). In response to detecting mobile device 400 (e.g., an authorized mobile device), the VAS may determine a distance (e.g., distance 504) between vehicle 101 and the authorized mobile device. For example, the plurality of BLE sensors may be disposed at different locations with vehicle 101, as described in further detail below with reference to FIG. 6. The VAS may determine a received signal strength indicator (RSSI) of the advertisement at each of the plurality of BLE sensors and select the one with the highest RSSI to determine the distance of mobile device 400 from the vehicle. For example, the BLE sensor with the highest RSSI may correspond to the BLE sensor with the best line-of-sight to the mobile device 400 and may therefore provide the best estimate of the distance of the authorized mobile device from the vehicle. While mobile device 400 is determined to be outside of boundary line 508 (a first distance from vehicle 101), the VAS may continue to monitor the location of mobile device 400, without, e.g., sending a notification to the central gateway or waking up any other domain controllers. In one approach, central gateway 201 may implement the functions of the VAS (e.g., driver presence and user proximity module 226 and user authorization module 228 of FIG. 2 may implement the functions of the VAS).

In response to determining that mobile device 400 continues to approach vehicle 101 and enters a near zone defined by boundary line 508, the VAS may send a notification to central gateway 201 indicating that a user is approaching. In response to receiving the notification, central gateway 201 may broadcast a standby command to each of the domain controllers 203 of control system 200. In response to receiving the standby command, certain domain controllers 203 may determine to transition to the standby state, so that the domain controllers may be quickly transitioned to a ready state when user 502 reaches vehicle 101. Certain domain controllers (ECUs) may take several seconds or tens of seconds to transition to a standby state. Thus, by transitioning these domain controllers to a standby state when user 502 is approximately 25 meters from vehicle 101, the domain controllers will have sufficient time to complete the transition to the standby state by the time the user reaches vehicle 101. In some embodiments, it may be advantageous to adjust the distance at which certain domain controllers begin transitioning from a sleep state (or stealth state) to a standby state base on a profile of user 502 (e.g., average walking speed) or the average transition time of each domain controller. For example, with reference to FIG. 2, XMM 204 may take several tens of seconds to transition to a standby state, while BMS 208 may take only a few seconds to transition to a standby state. Thus, XMM 204 may begin to transition to the standby state when user 502 is approximately 25 meters from vehicle 101, while BMS 208 may begin to transition to the standby state user 502 is approximately 10 meters from vehicle 101. In this way, battery power may be conserved if user 502 does not enter vehicle 101.

In some embodiments, it may be advantageous to detect a location of vehicle 101 (e.g., using GPS system 134 of FIG. 1) and adjust the wake-up behavior based on the detected location. For example, if vehicle 101 is located at a home of user 502, user 502 may pass by vehicle 101 several times a day without intending to enter vehicle 101. In this case, central gateway 201 may determine to broadcast a vehicle power modes command to domain controllers 203 to transition to the standby state (e.g., in response to an erroneous determination by the VAS that user 502 intends to use vehicle 101). Thus, by considering additional information to determine if user 502 is actually intending to use vehicle 101) unnecessary wake-up sequences may be reduced. In one example, central gateway 201 may determine if another device (e.g., key fob 142 of FIG. 1) is also detected. Because a user is likely to have both their key fob and authorized mobile device if they are planning on using vehicle 101, central gateway 201 may broadcast the vehicle power modes command to transition to the standby state in response to detecting both the authorized mobile device and the key fob. In another example, central gateway 201 may analyze a profile of user 502 to determine when user 502 is likely to use vehicle 101 and how often user 502 enters within the near zone of vehicle 101. Based on a result of this determination, central gateway 201 may refrain from broadcasting the command to transition to the standby state until the authorized mobile device is closer to vehicle 101 (e.g., based on an increasing confidence that user 502 intends to use vehicle 101 as user 502 continues to approach).

In some embodiments, in response to determining that the mobile device 400 enters the near zone defined by boundary line 508, TCM 202 may establish a two-way wireless connection (e.g., a connection via the BLE standard) between vehicle 101 and mobile device 400. Before a BLE connection is established, commands may be sent from mobile device 400 to vehicle 101 through the cloud. However, once a BLE connection is established, commands may be sent from mobile device 400 to vehicle 101 over the BLE connection, as explained in further detail below.

Figure 6:
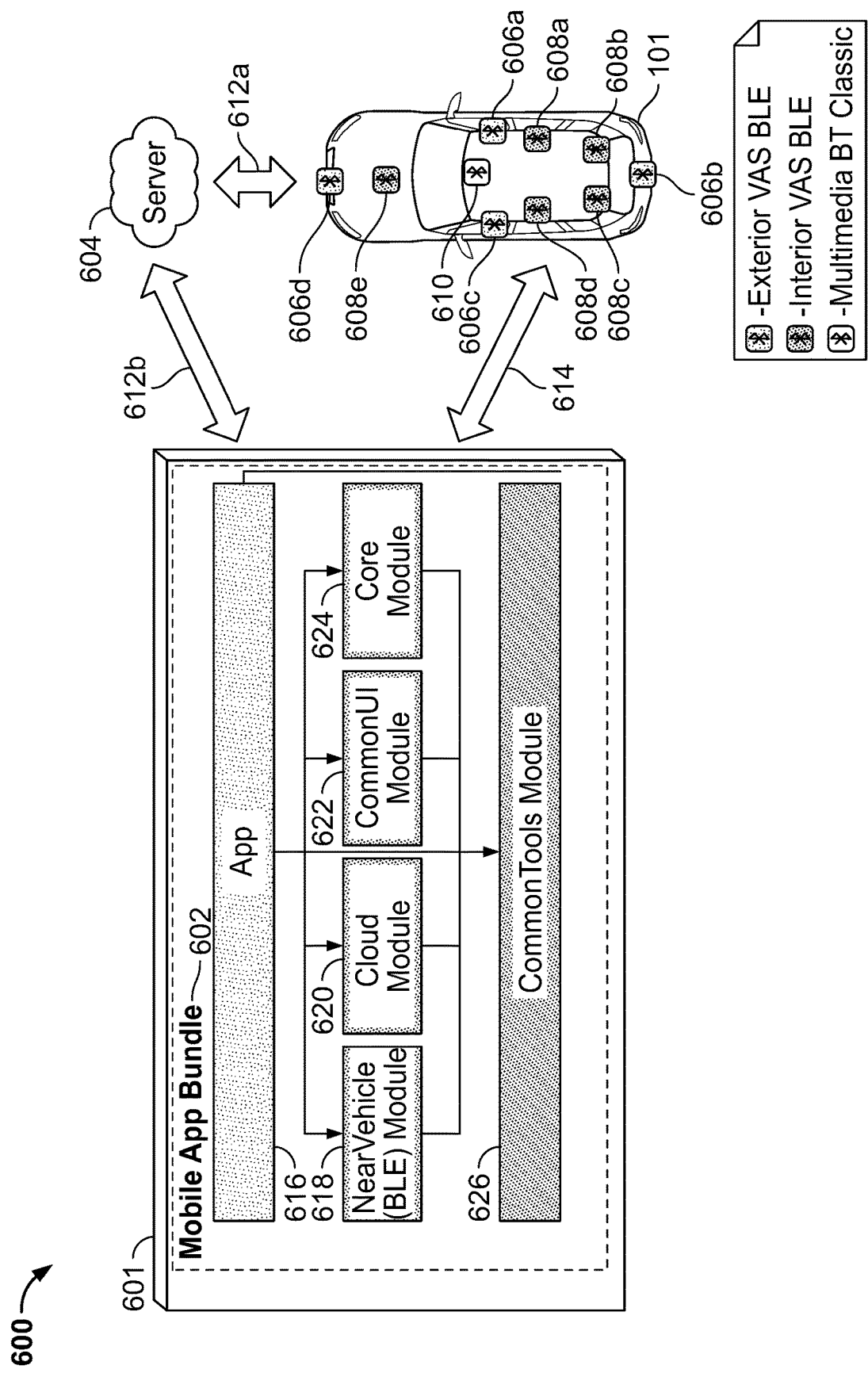
FIG. 6 is a diagram of components of a system including a vehicle and a mobile device, in accordance with some embodiments of the present application.

FIG. 6 is a diagram of components of a system 600 including vehicle 101 and mobile device 601, in accordance with some embodiments of the present application. Mobile device 601 may correspond to mobile device 400 of FIGS. 4 and 5 (and user device 138 of FIG. 1). As shown, mobile application bundle 602 (e.g., implementing a vehicle interface application) associated with vehicle 101 may be implemented by mobile device 601. As shown, the vehicle interface application is configured to communicate with the vehicle through a plurality of different communications paths including direct communication path 614 (e.g., a BLE communication path) and an indirect communication path 612a, 612b (e.g., a mobile communication path such as LTE or a Wi-Fi communication path) through remote server 604 (e.g., a cloud communication path). As shown, the vehicle may include a plurality of Bluetooth/BLE sensors (e.g., VAS sensors), including exterior VAS BLE sensors 606a, 606b, 606c, and 606d (collectively referred to as exterior VAS BLE sensors 606), interior VAS BLE sensors 608a, 608b, 608c, 608d, 608e (collectively referred to as interior VAS BLE sensors 608), and multimedia BT classic sensor 610. In some embodiments, certain ones of these sensors (e.g., exterior VAS BLE sensors 606 may be operated in an always-on state (e.g., so as to be able to detect mobile device 400 approach vehicle 101, as described above with reference to FIG. 5). As described in greater detail below, the vehicle interface application may transmit commands to vehicle 101 through each of direct communication path 614 and indirect communication path 612a, 612b (e.g., to remotely control certain functions of vehicle 101). Additionally, the vehicle interface application may receive status information of vehicle 101 through each of the direct communication path 614 and the indirect communication path 612a, 612b (collectively, 612). In some embodiments, it may be advantageous to prioritize direct communication path 614 (e.g., a BLE communication path) for certain communication (e.g., vehicle commands and vehicle status information). For example, although direct communication path 614 may have a shorter range and a lower throughput than indirect communication path 612 (e.g., mobile communication paths, cellular, Wi-Fi, etc.), direct communication path 614 may also have lower latency. Thus, for example, commands that are able to be communicated over direct communication path 614 may be executed quicker (e.g., unlocking a door of vehicle 101). Additionally, by providing indirect communication path 612 when direct communication path 614 is not available (e.g., user 502 is outside of BLE range as shown in FIG. 5), reliable communication between mobile device 601 and vehicle 101 may be improved, as described in greater detail below.

As shown, the vehicle interface application may be implemented by a plurality of modules for performing the functions discussed herein. App module 616 may refer to a high-level container of the app business logic and may handle UI rendering, orchestrate all other modules, etc. Near vehicle BLE module 618 may control BLE communication with VAS sensors of vehicle 101 (e.g., scanning, connection, security, read/write operations, etc.). Cloud module 620 may provide access to Cloud APIs (e.g., on a remote server). Common UI module 622 may provide shared UI components for app 616. Core module 624 may provide functionality to send commands to vehicle 101 through direct communication path 614 or indirect communication path 612 (e.g., BLE or Cloud path) using the router architecture of mobile device 601 (e.g., as described above with reference to FIG. 4). Common Tools module 626 may provide different tools such as logging, OS permission handling, network status handling, etc. The vehicle interface application may perform the functions discussed above and below. The vehicle interface application may also access suitable software libraries or bundles (e.g., React Native Bundle) to perform the functions described above and below.

Figure 7:
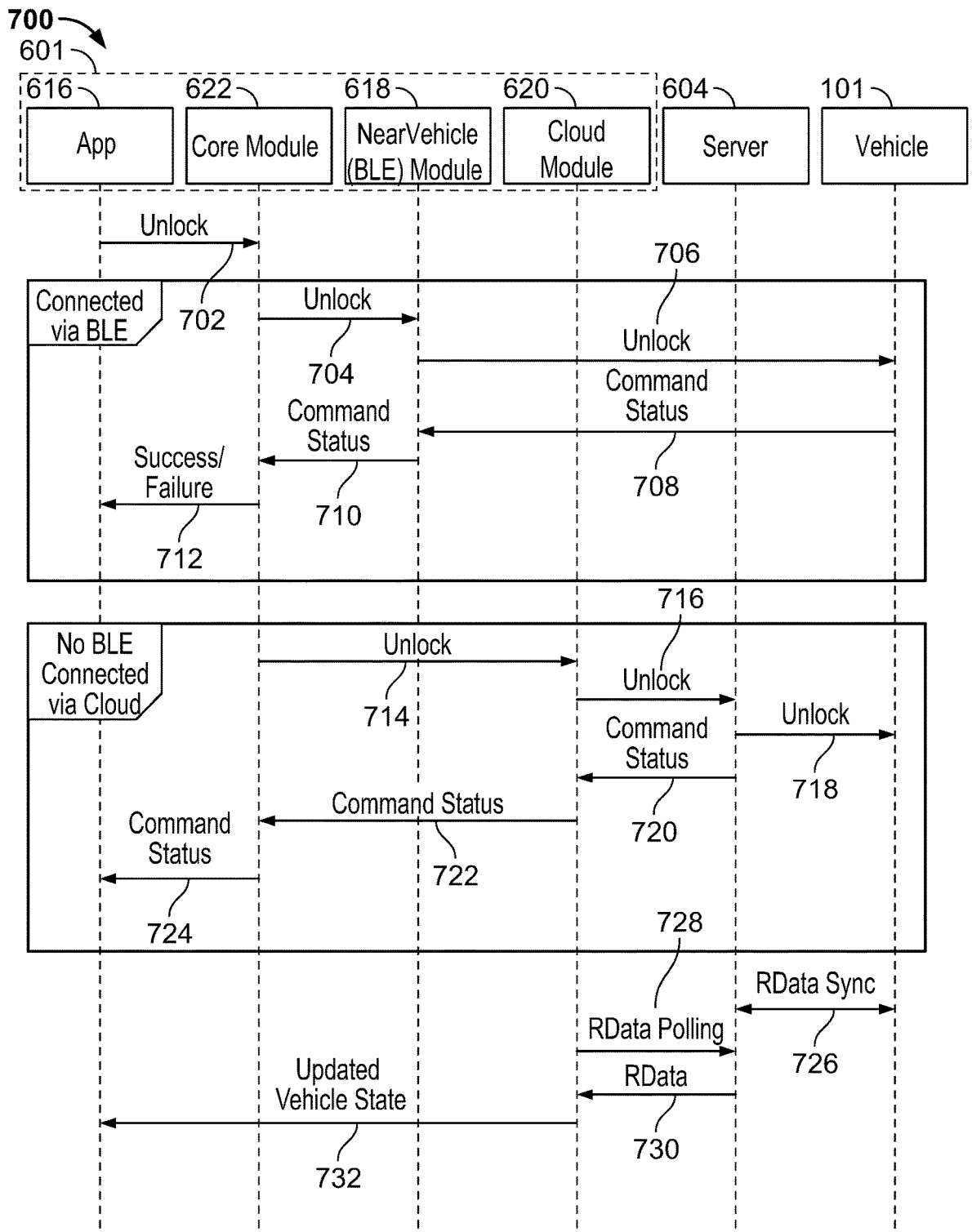
FIG. 7 is a block diagram representing transmission of data related to a command transmitted from a mobile device to a vehicle, in accordance with some embodiments of the present disclosure.

FIG. 7 is a block diagram 700 representing transmission of data related to a command transmitted from mobile device 601 to vehicle 101, in accordance with some embodiments of the present disclosure. As shown, mobile device 601 may send a command (e.g., an unlock command) to vehicle 101 through a BLE connection (e.g., direct communication path 614) when available, and/or through a remote connection (e.g., indirect communication path 612). For example, mobile device 601 may display a user interface (UI) that displays status information of vehicle 101 and allows the user to control certain functions of vehicle 101 (e.g., lock/unlock, preheat, etc.). As described in further detail below, it is advantageous for mobile device 601 to communicate with the vehicle directly via the BLE connection (e.g., due to faster communication, lower resource use, etc.). However, if the BLE connection fails or mobile device 601 is not within BLE range of vehicle 101, it may be advantageous to communicate with the vehicle indirectly through the Cloud path (e.g., indirect communication path 612).

As shown, in response to receiving a request from a user to unlock vehicle 101 (e.g., through a user interface displayed by mobile device 601) when mobile device 601 is connected to vehicle 101 via BLE, app 616 generates and forwards unlock command 702 to core module 622, which forwards unlock command 704 to near vehicle (BLE) module 618 which, which forwards unlock command 706 to vehicle 101 via the BLE connection. In response to receiving unlock command 706, vehicle 101 executes (or attempts to execute) the unlock command and returns command status message 708 back to near vehicle (BLE) module 618 via the BLE connection. Near vehicle (BLE) module 618 forwards commands status message 710 to core module 622, which forwards status message 712 (e.g., success or failure) to app 616 for display by mobile device 601.

If, however, mobile device 601 is not connected to vehicle 101 via BLE (but is only connected to vehicle 101 via the cloud) when core module 622 receives unlock command 702, core module 622 forwards unlock command 714 to cloud module 620, which forwards unlock command 716 to remote server 604 (e.g., the cloud) via a remote connection (e.g., cellular), which forwards unlock command 718 to vehicle 101 (e.g., through TCM 202). In response to receiving unlock command 718, vehicle 101 executes (or attempts to execute) the unlock command and returns command status message 720 back to cloud module 620 via the remote connection. Cloud module 620 forwards commands status message 722 to core module 622, which forwards status message 724 (e.g., success or failure) to app 616 for display by mobile device 601.

In some embodiments, as shown, vehicle 101 may periodically, in response to executing a command/updating status information, or in response to a request from server 604, transmit updated vehicle state information to remote server 604 (e.g., by rData sync operation 726). Remote server 604 may relay the updated vehicle state information to the vehicle interface application through the remote connection (e.g., cloud SKD receives vehicle data 730 in response to polling request 728 and provides updated vehicle state information 732 to app 616 for display by mobile device 601).

In some embodiments, as described in further detail below, the vehicle interface application may initiate a timeout threshold in response to sending a command. If the vehicle interface application does not receive a reply to the command within the timeout threshold, the vehicle interface application may determine that the command failed. The timeout threshold may be set to a short time period (e.g., 5 seconds) so that the command may be quickly resent via another connection (e.g., cellular) without alerting a user that the BLE connection failed, thereby improving the experience of the user.

Figure 8:
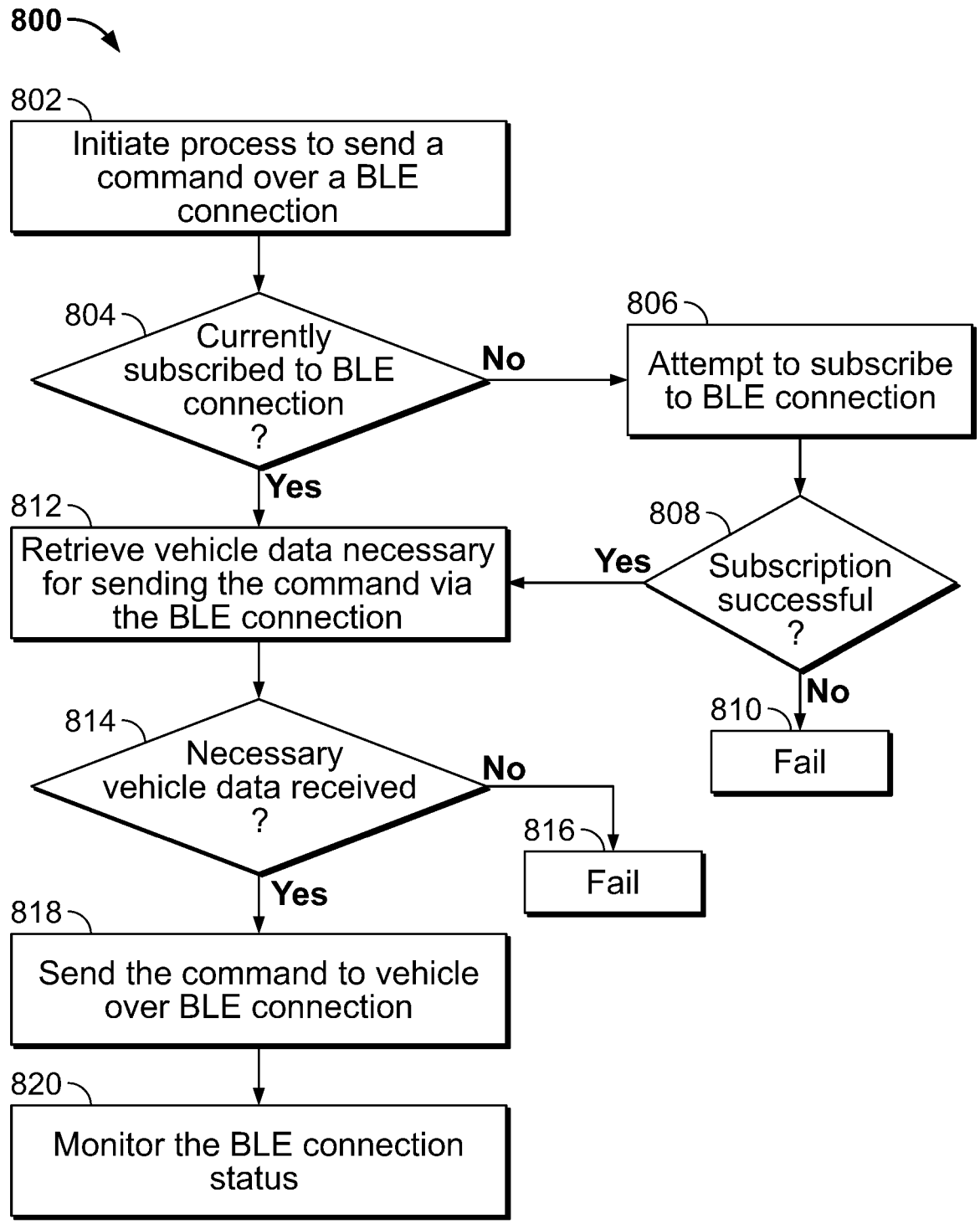
FIG. 8 shows a flowchart of an illustrative process for sending a command to a vehicle over a BLE connection, in accordance with some embodiments of the present disclosure.

FIG. 8 shows a flowchart of an illustrative process 800 for sending a command to a vehicle (e.g., vehicle 101) over a BLE connection (e.g., direct communication path 614 of FIG. 6), in accordance with some embodiments of the present disclosure. Process 800 may be executed by processing circuitry (e.g., processing circuitry 406) of mobile device 601. Process 800 may begin at 802 when processing circuitry 406 determines to initiate a process to send a command over a BLE connection (e.g., in response to receiving a command via an interface of mobile device 601).

At 804, processing circuitry 406 may determine if mobile device 601 is currently subscribed to a BLE connection. In response to determining that mobile device 601 is currently subscribed to a BLE connection ("Yes"), the process proceeds to 812. Otherwise ("No"), the process proceeds to 806.

At 806, processing circuitry 406 attempts subscribe to the BLE connection.

At 808, processing circuitry 406 determines if the attempt to subscribe to the BLE connection was successful. In response to determining that the attempt to subscribe was successful ("Yes"), the process proceeds to 812. Otherwise ("No"), the process proceeds to 810 and indicates a failure of the attempt to send the command over the BLE connection. Instead of displaying an indication of this failure to the user (e.g., by mobile device 601), mobile device 601 may attempt to resend the command via a remote connection (e.g., indirect communication path 612 of FIG. 6)

At 812, processing circuitry 406 executes a function to retrieve vehicle data necessary for sending the command via the BLE connection (e.g., data to format or encrypt the command to be readable by vehicle 101).

At 814, processing circuitry 406 determines if the necessary vehicle data is received. In response to determining that the necessary vehicle data is received ("Yes"), the process proceeds to 818. Otherwise ("No"), the process proceeds to 816 and indicates a failure of the attempt to send the command over the BLE connection (and, e.g., attempts to resend the command via the remote connection.

At 818, processing circuitry 406 executes a function to send the commend via the BLE connection. In some embodiments, processing circuitry 406 may also monitor the BLE connection to wait for an acknowledgment from the vehicle indicating that the command is successfully executed, as described in further detail above with reference to FIG. 7.

At 820, processing circuitry 406 monitors the BLE connection to update a status of the BLE connection (e.g., connected or failed).

Figure 9:
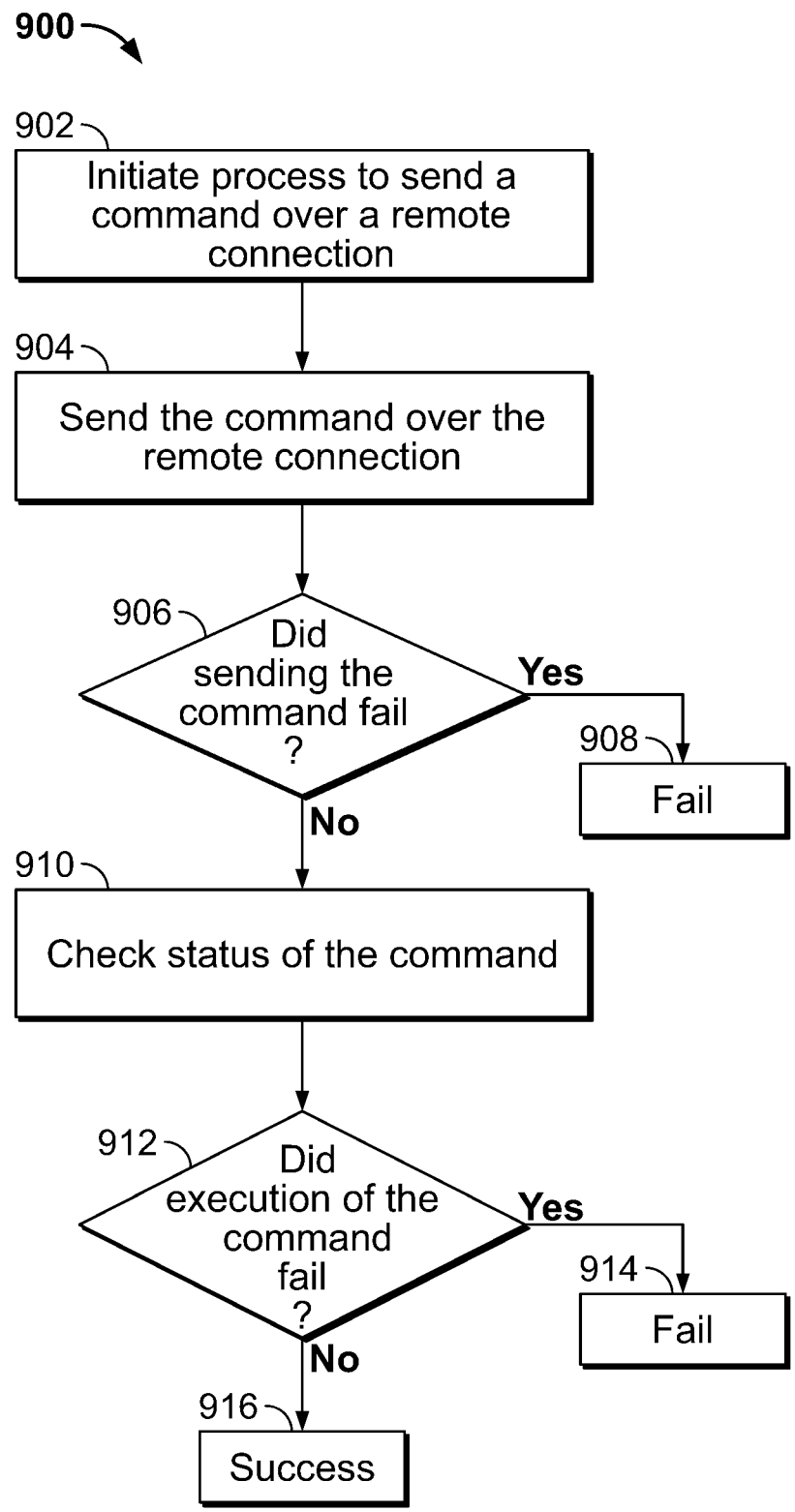
FIG. 9 shows a flowchart of an illustrative process for sending a command to a vehicle over a mobile connection, in accordance with some embodiments of the present disclosure.

FIG. 9 shows a flowchart of an illustrative process 900 for sending a command to a vehicle (e.g., vehicle 101) over a mobile connection (e.g., indirect communication path 612 of FIG. 6), in accordance with some embodiments of the present disclosure. Process 900 may be executed by processing circuitry (e.g., processing circuitry 406) of mobile device 601 (e.g., implemented by mobile device 400, in response to a failure to transmit the command to vehicle 101 according to process 800 of FIG. 8 (i.e., "Fail") or when the BLE connection is not available (e.g., mobile device 601 is outside of BLE range). Process 900 may begin at 902 when processing circuitry 406 determines to initiate the process to send a command to vehicle 101 over via remote server 604 (e.g., using a remote connection).

At 904, processing circuitry 406 executes a function to send the command over the remote connection with remote server 604 (e.g., a cellular connection). In some embodiments, the command may be sent using HTTPs or Websocket protocol. However, it should be understood that any suitable protocol may be used.

At 906, processing circuitry 406 determines if the command was successfully relayed to vehicle 101 by remote server 604. For example, processing circuitry 406 may wait for a predetermined time to see if an acknowledgment or failure notification is received by remote server 604. For example, if remote server 604 is not able to establish a connection with vehicle 101 (e.g., vehicle 101 does not currently have an Internet connection), remote server 604 may transmit a failure notification to mobile device 601. In response to determining that sending the command failed ("Yes"), the process proceeds to 908. In some embodiments, if both attempts to send the command fail (e.g., via both the direct and indirect connections), processing circuitry 406 may generate a notification on mobile device 601 informing the user that the command failed as vehicle 101 is out of range. Otherwise, processing circuitry 406 determines that the command was successfully sent, the process proceeds to 910.

At 910, processing circuitry 406 executes a command to check the status of the command. For example, processing circuitry 406 may monitor the remote connection to wait for an acknowledgment from vehicle 101 (via remote server 604) indicating that the command is successfully executed, as described in further detail above with reference to FIG. 7.

At 912, if processing circuitry 406 determines that execution of the command failed ("Yes"), the process proceeds to 914 (e.g., similar to 908 described above). Otherwise, if processing circuitry 406 determines that execution of the command did not fail ("No"), the process proceeds to 916 and determines the execution of the command was successful. In some embodiments, in response to determining that execution of the command was successful, processing circuitry 406 may update the corresponding status information on the interface of the mobile application (e.g., inform the user that vehicle 101 is now unlocked).

Figure 10:
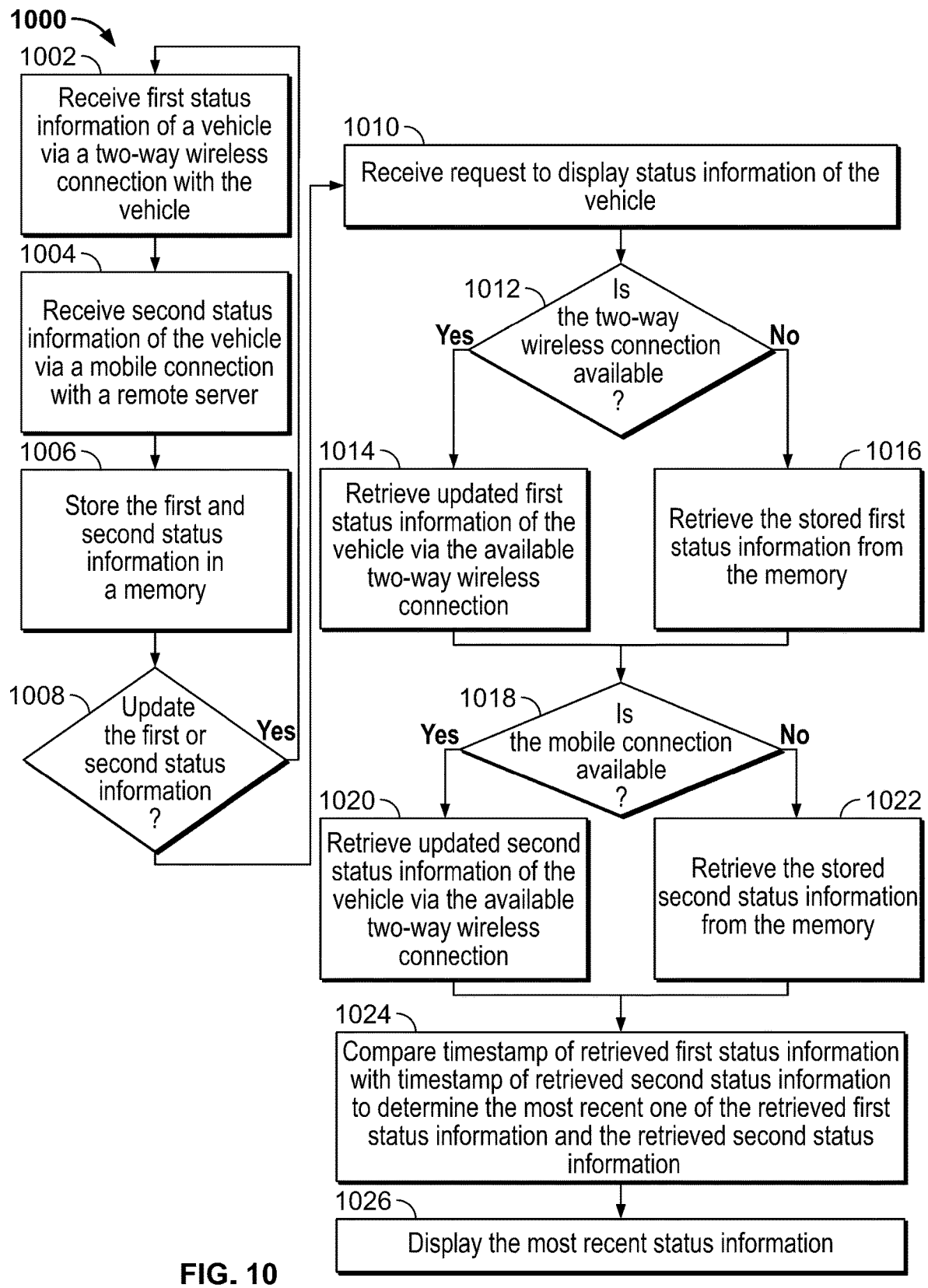
FIG. 10 shows a flowchart of an illustrative process for retrieving and displaying status information of a vehicle, in accordance with some embodiments of the present disclosure.

FIG. 10 shows a flowchart of an illustrative process 1000 for retrieving and displaying status information of a vehicle (e.g., vehicle 101), in accordance with some embodiments of the present disclosure. The process 1000 may be executed by processing circuitry (e.g., processing circuitry 406) of a mobile device (e.g., mobile device 601). Process 1000 may begin at 1002 when processing circuitry 406 receives first status information of vehicle 101 via a two-way wireless connection with vehicle 101 (e.g., a BLE connection) (e.g., direct communication path 614 of FIG. 6). In some embodiments, the vehicle may send the first status information to mobile device 601 in response to executing a command (e.g., as described in greater detail with reference to FIG. 7) or when a status of vehicle 101 changes. In some embodiments, vehicle 101 may periodically send the first status information to mobile device 601 when the two-way wireless connection is available.

At 1004, the processing circuitry 406 receives second status information of vehicle 101 via a mobile connection (e.g., an LTE connection, Wi-Fi connection, etc.) (e.g., indirect communication path 612 of FIG. 6) with a remote server (e.g., remote server 604). For example, remote server 604 may periodically update the second status information through a remote connection with vehicle 101 (e.g., vehicle 101 may periodically upload the second status information to remote server 604). In some embodiments, remote server 604 may push the second status information to the mobile device or send the second status information in response to a request from mobile device 601.

At 1006, the processing circuitry 406 stores the received first and second status information in a memory (e.g., storage 408). In some embodiments, the processing circuitry 406 may overwrite the stored first and second status information with new first and second status information when it is received (e.g., so that only the most recent first and second status information is stored in the memory).

At 1008, processing circuitry 406 determines whether to update either of the stored first or second status information. For example, processing circuitry 406 may periodically (e.g., once a day or when the vehicle interface application is opened).

At 1010, processing circuitry 406 receives a request to display status information of vehicle 101. In some embodiments, the request may correspond to a user opening the vehicle interface application. In some embodiments, the request may correspond to a refresh request from the user.

At 1012, processing circuitry 406 determines if the two-way wireless connection is available. For example, processing circuitry 406 may determine if a BLE connection is established and active, as described above. In response to determining that the two-way wireless connection is available ("Yes"), the process proceeds to 1014. Otherwise ("No"), the process proceeds to 1016.

At 1014, in response to determining that the two-way wireless connection is available, processing circuitry 406 retrieves updated first status information of vehicle 101 via the available two-way wireless connection. For example, processing circuitry 406 may transmit a request to vehicle 101 via the available two-way wireless connection and receives the updated first status information (i.e., the current status information) in response to the request. In some embodiments, vehicle 101 may store the first status information in a cache of a BLE transceiver of vehicle 101 so that vehicle 101 does not need to wake up to send the first status information to mobile device 601. In some embodiments, in response to retrieving the updated first station information via the available two-way wireless connection, the process may proceed directly to 1024 and displayed the retrieved updated first station information. That is, for data retrieved over the two-way wireless connection, processing circuitry 406 may assume that this data is the most recent status information and display the data without determining if the mobile connection is available, at 1018).

At 1016, in response to determining that the two-way wireless connection is not available, processing circuitry 406 retrieves the most recently stored first status information from the memory.

At 1018, processing circuitry 406 determines if the mobile connection with remote server 604 is available. In response to determining that the remote connection is available ("Yes"), the process proceeds to 1020. Otherwise ("No"), the process proceeds to 1022.

At 1020, in response to determining that the remote connection is available, processing circuitry 406 retrieves updated second status information of vehicle 101 via the remote connection. For example, processing circuitry 406 may transmit a request to remote server 604 to obtain the most recent second status information and receive the updated second status information (i.e., the most recent status information) in response to the request.

At 1022, in response to determining that the remote connection is not available (e.g., when mobile device 601 does not have internet access or when remote server 604 is unresponsive), processing circuitry 406 retrieves the most recently stored second status information from the memory.

At 1024, processing circuitry 406 compares a timestamp of the retrieved first status information with a timestamp of the retrieved second status information to determine the most recent one of the retrieved first status information and the retrieved second status information. For example, because vehicle 101 may only periodically update the second status information, the second status information may not actually represent the current status information of vehicle 101. Accordingly, each piece of status information may be stored in association with a timestamp that represents when the status information was recorded in vehicle 101. In some embodiments, because certain status information may only be periodically updated, different status information may have different timestamp. For example, some status information may be updated frequently (e.g., door unlock/lock status), while other status information may be updated less frequently (e.g., the miles driven may be updated once a day).

At 1026, the processing circuitry displays the most recent status information on an interface of mobile device 601. In some embodiments, processing circuitry 406 displays the status information with the associated timestamp. In some embodiments, processing circuitry 406 only displays the associated timestamp if the associated timestamp does not correspond to the present time (e.g., "Battery charge level 65% (updated 1 hour ago).").

The processes discussed above are intended to be illustrative and not limiting. One skilled in the art would appreciate that the steps of the processes discussed herein may be omitted, modified, combined and/or rearranged, and any additional steps may be performed without departing from the scope of the invention. For example, steps 1012-1016 may be performed after (or in parallel with) steps 1018-1022. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

What is claimed is:

1. A control method of a device for remotely controlling a vehicle, the method comprising:
   receiving, via a user interface of the device, a command for controlling the vehicle;
   determining whether a first two-way wireless connection is available between the device and the vehicle;
   in response to determining that the first two-way wireless connection is available, transmitting the command to the vehicle via the first two-way wireless connection; and
   in response to determining that the first two-way wireless connection is no longer active or determining that the transmitting the command to the vehicle via the first two-way wireless connection was not successful, transmitting the command to a remote server associated with the vehicle via a second two-way connection.

2. The control method of claim 1, wherein the first two-way wireless connection is a connection via Bluetooth Low Energy (BLE) standard.

3. The control method of claim 1, wherein the determining that the transmitting the command to the vehicle via the first two-way wireless connection was not successful comprises determining that an acknowledgment is not received within a first predetermined time of transmitting the command to the vehicle via the first two-way wireless connection.

4. The control method of claim 1, further comprising:
   in response to transmitting the command to the remote server via the second two-way connection, determining whether the command was received by the vehicle by determining whether an acknowledgement is received within a second predetermined time of transmitting the command via the second two-way connection; and
   in response to determining that the command was not received by the vehicle, displaying, via an interface of the device, an indication that the command failed.

5. The control method of claim 1, wherein the device is a mobile device.

6. The control method of claim 1, wherein the command comprises a lock command for locking the vehicle or an unlock command for unlocking the vehicle.

7. A device for remotely controlling a vehicle, the device comprising:
   a user interface;
   a memory storing instructions; and
   control circuitry configured to execute the instructions stored in the memory to:
      receive, via the user interface, a command for controlling the vehicle;
      determine whether a first two-way wireless connection is available between the device and the vehicle;
      in response to determining that the first two-way wireless connection is available, transmit the command to the vehicle via the first two-way wireless connection; and
      in response to determining that the first two-way wireless connection is no longer active or determining that the transmitting the command to the vehicle via the first two-way wireless connection was not successful, transmit the command to a remote server associated with the vehicle via a second two-way connection.

8. The device of claim 7, wherein the device is a mobile device and the first two-way wireless connection is a connection via Bluetooth Low Energy (BLE) standard.

9. A control method of a device for remotely controlling a vehicle, the method comprising:
   receiving, from the vehicle, first status information of the vehicle via a first two-way wireless connection between the device and the vehicle;
   receiving, from a remote server, second status information of the vehicle via a second two-way connection with a remote server; and in response to receiving, via a user interface of the device, a request to display status information of the vehicle:
  determining a most recent one of the first and second status information by comparing a first timestamp associated with the first status information with a second timestamp associated with the second status information; and
  displaying, on the user interface of the device, the most recent status information.

10. The control method of claim 9, wherein the receiving the first status information comprises:
in response to receiving the request to display the status information of the vehicle:
  determining whether the first two-way wireless connection is available between the device and the vehicle;
  in response to determining that the first two-way wireless connection is available, transmitting a first request for the first status information to the vehicle via the first two-way wireless connection, wherein the first status information is received in response to transmitting the first request; and
  in response to determining that the first two-way wireless connection is not available, retrieving, from a memory of the device, the most recent status information received from the vehicle via the first two-way wireless connection as the first status information.

11. The control method of claim 10, wherein the receiving the second status information comprises:
in response to receiving the request to display the status information of the vehicle:
  determining whether the second two-way connection is available;
  in response to determining that the second two-way connection is available, transmitting a second request for the second status information to the remote server via the second two-way connection, wherein the second status information is received in response to transmitting the second request; and
  in response to determining that the second two-way connection is not available, retrieving, from the memory of the device, the most recent status information received from the remote server as the second status information.

12. The control method of claim 10, wherein the displaying the most recent status information comprises displaying the most recent status information in association with the corresponding one of the first and second timestamp.

13. The control method of claim 12, wherein the first timestamp indicates when the vehicle generated the first status information and the second timestamp indicates when the vehicle generated the second status information.

14. The control method of claim 10, wherein the first two-way wireless connection is a connection via Bluetooth Low Energy (BLE) standard.

15. A device for remotely controlling a vehicle, the device comprising:
a user interface;
a memory storing instructions; and
control circuitry configured to execute the instructions stored in the memory to:
  receive, from the vehicle, first status information of the vehicle via a first two-way wireless connection between the device and the vehicle;
  receive, from a remote server, second status information of the vehicle via a second two-way connection with a remote server; and
  in response to receiving, via the user interface, a request to display status information of the vehicle:
    determine a most recent one of the first and second status information by comparing a first timestamp associated with the first status information with a second timestamp associated with the second status information; and
    display, on the user interface, the most recent status information.

16. The device of claim 15, wherein the control circuitry is further configured, when receiving the first status information, to:
in response to receiving the request to display the status information of the vehicle:
  determine whether the first two-way wireless connection is available between the device and the vehicle;
  in response to determining that the first two-way wireless connection is available, transmit a first request for the first status information to the vehicle via the first two-way wireless connection, wherein the first status information is received in response to transmitting the first request; and
  in response to determining that the first two-way wireless connection is not available, retrieve, from the memory, the most recent status information received from the vehicle via the first two-way wireless connection as the first status information.

17. The device of claim 16, wherein the control circuitry is further configured, when receiving the second status information, to:
in response to receiving the request to display the status information of the vehicle:
  determine whether the second two-way connection is available;
  in response to determining that the second two-way connection is available, transmit a second request for the second status information to the remote server via the second two-way connection, wherein the second status information is received in response to transmitting the second request; and
  in response to determining that the second two-way connection is not available, retrieve, from the memory, the most recent status information received from the remote server as the second status information.

18. The device of claim 15, wherein the control circuitry is further configured, when displaying the most recent status information, to display the most recent status information in association with the corresponding one of the first and second timestamp, and
wherein the first timestamp indicates when the vehicle generated the first status information and the second timestamp indicates when the vehicle generated the second status information.

19. The device of claim 15, wherein the device is a smartphone and the first two-way wireless connection is a connection via Bluetooth Low Energy (BLE) standard.

* * * * *